United States Patent
Shapira

(10) Patent No.: US 11,797,908 B2
(45) Date of Patent: Oct. 24, 2023

(54) FILL MODELING FOR HYBRID LAST-MILE DELIVERY

(71) Applicant: CHEETAH TECHNOLOGIES INC., San Francisco, CA (US)

(72) Inventor: Sephi Joseph Shapira, New York, NY (US)

(73) Assignee: CHEETAH TECHNOLOGIES INC., San Francisco, CA (US)

(*) Notice: Subject to any disclaimer, the term of this patent is extended or adjusted under 35 U.S.C. 154(b) by 0 days.

(21) Appl. No.: 17/022,969

(22) Filed: Sep. 16, 2020

(65) Prior Publication Data
US 2020/0410438 A1 Dec. 31, 2020

(51) Int. Cl.
| | | |
|---|---|---|
| *G06Q 10/08* | (2023.01) | |
| *G06Q 10/0832* | (2023.01) | |
| *G06N 5/025* | (2023.01) | |
| *G06Q 10/067* | (2023.01) | |
| *G06Q 10/0833* | (2023.01) | |

(52) U.S. Cl.
CPC ......... *G06Q 10/0832* (2013.01); *G06N 5/025* (2013.01); *G06Q 10/067* (2013.01); *G06Q 10/0833* (2013.01)

(58) Field of Classification Search
CPC ............. G06Q 10/0832; G06Q 10/067; G06Q 10/0833; G06N 5/025
USPC .......................................... 705/348, 1.1, 7.11
See application file for complete search history.

(56) References Cited

U.S. PATENT DOCUMENTS

| | | |
|---|---|---|
| 7,251,621 B1 | 7/2007 | Weng |
| 10,783,460 B1 | 9/2020 | Davis |
| 2002/0082887 A1 | 6/2002 | Boyert |
| 2005/0075952 A1* | 4/2005 | Zhang .................... G06Q 10/06 705/28 |

(Continued)

FOREIGN PATENT DOCUMENTS

| | | | | |
|---|---|---|---|---|
| CN | 102725703 A | * | 10/2012 | ............. G05B 13/04 |
| CN | 102804083 B | * | 1/2016 | ............. G06Q 10/08 |

(Continued)

OTHER PUBLICATIONS

Sivasothy, Paaranan et al. "Proof of Concept: Machine Learning Based Filling Level Estimation for Bulk Solid Silos." Proceedings of Meetings on Acoustics. vol. 35. N.p., 2018. Web. (Year: 2018).*

(Continued)

*Primary Examiner* — Akiba K Robinson
(74) *Attorney, Agent, or Firm* — Pillsbury Winthrop Shaw Pittman LLP

(57) ABSTRACT

Systems and methods are described for fill modeling in hybrid last-mile deliveries. Hybrid last-mile delivery may refer to delivery of items in which a delivery vehicle meets customers at a pickup location at a specified time. Thus, instead of conventional last-mile delivery in which a delivery vehicle delivers items to an end point, such as a customer home, customers are to meet the delivery vehicle at a specified location and time to pick up items. The systems and methods described herein may include computational modeling of delivery vehicles and items to be delivered in a hybrid last-mile delivery to identify or select delivery vehicles and/or filling the delivery vehicles.

18 Claims, 18 Drawing Sheets

(56) References Cited

U.S. PATENT DOCUMENTS

| | | | |
|---|---|---|---|
| 2005/0177440 A1* | 8/2005 | Mathe | G06Q 30/0635 |
| | | | 705/26.81 |
| 2006/0020366 A1 | 1/2006 | Bloom | |
| 2008/0065262 A1* | 3/2008 | Gottlieb | G06Q 50/30 |
| | | | 700/213 |
| 2009/0138384 A1* | 5/2009 | McCormick | G06Q 10/0637 |
| | | | 705/28 |
| 2010/0211426 A1 | 8/2010 | McClurg | |
| 2013/0262276 A1 | 1/2013 | Wan | |
| 2013/0262252 A1 | 10/2013 | Lakshman | |
| 2014/0052661 A1 | 2/2014 | Shakes | |
| 2014/0074743 A1 | 3/2014 | Rademaker | |
| 2015/0227882 A1 | 8/2015 | Bhatt | |
| 2015/0262121 A1 | 9/2015 | Riel-Dalpe | |
| 2015/0319414 A1* | 11/2015 | Haist | G06F 3/0482 |
| | | | 348/744 |
| 2016/0068264 A1 | 3/2016 | Ganesh | |
| 2016/0171439 A1 | 6/2016 | Ladden | |
| 2016/0247113 A1 | 8/2016 | Rademaker | |
| 2016/0300184 A1 | 10/2016 | Zamer | |
| 2017/0161670 A1 | 6/2017 | Ng | |
| 2017/0330144 A1 | 11/2017 | Wakim | |
| 2017/0337523 A1 | 11/2017 | Roach | |
| 2019/0367278 A1* | 12/2019 | Bellar | G06Q 50/28 |
| 2020/0226543 A1 | 7/2020 | Sharinn | |
| 2020/0250737 A1* | 8/2020 | Wallace | H04W 4/23 |
| 2020/0269136 A1* | 8/2020 | Gurumurthy | G06N 5/04 |
| 2020/0320473 A1* | 10/2020 | Kibbey | G06Q 10/0832 |

FOREIGN PATENT DOCUMENTS

| | | | | |
|---|---|---|---|---|
| CN | 110245457 A | * | 9/2019 | G01N 15/02 |
| JP | 2020077307 A | * | 5/2020 | |

OTHER PUBLICATIONS

Office Action, U.S. Appl. No. 17/022,932 dated Nov. 27, 2020, 40 pages.

Office Action, U.S. Appl. No. 17/023,001 dated Nov. 17, 2020, 19 pages.

* cited by examiner

Static Pickup Locations

Dynamic Pickup Locations

1000

```
┌─────────────────────────────────────────────────────────────────┐
│ RECEIVE AN INDICATION THAT A DELIVERY VEHICLE IS AT A PICKUP   │
│ LOCATION TO DELIVER A PLURALITY OF PICKUP ORDERS TO BE PICKED  │
│ UP BY A RESPECTIVE CUSTOMER                                     │
│ 1002                                                            │
└─────────────────────────────────────────────────────────────────┘
                                │
                                ▼
┌─────────────────────────────────────────────────────────────────┐
│ RECEIVE, FROM A DELIVERY VEHICLE DEVICE, AN ENCODING            │
│ REPRESENTING A FIRST PICKUP ORDER FROM AMONG THE PLURALITY OF   │
│ PICKUP ORDERS, THE ENCODING BEING SCANNED FROM A FIRST CUSTOMER │
│ DEVICE DURING A PICKUP OF THE FIRST PICKUP ORDER AT THE PICKUP  │
│ LOCATION                                                        │
│ 1004                                                            │
└─────────────────────────────────────────────────────────────────┘
                                │
                                ▼
┌─────────────────────────────────────────────────────────────────┐
│ TRANSMIT, TO THE DELIVERY VEHICLE DEVICE, IDENTIFYING           │
│ INFORMATION THAT IDENTIFIES THE FIRST PICKUP ORDER TO           │
│ FACILITATE PROVISION OF THE FIRST PICKUP ORDER TO A FIRST       │
│ CUSTOMER                                                        │
│ 1006                                                            │
└─────────────────────────────────────────────────────────────────┘
                                │
                                ▼
┌─────────────────────────────────────────────────────────────────┐
│ RECEIVE, FROM THE DELIVERY VEHICLE DEVICE, AN INDICATION THAT   │
│ THE FIRST PICKUP ORDER HAS BEEN PROVIDED TO AND PICKED UP BY    │
│ THE FIRST CUSTOMER                                              │
│ 1008                                                            │
└─────────────────────────────────────────────────────────────────┘
```

*FIG. 10*

FILL MODELING FOR HYBRID LAST-MILE DELIVERY

RELATED APPLICATIONS

This application is related to U.S. patent application Ser. No. 17/022,932, entitled "LOCATION MODELING FOR HYBRID LAST-MILE DELIVERY" and U.S. patent application Ser. No. 17/023,001, entitled "INTERFACES AND LOGISTICS TRACKING FOR HYBRID LAST-MILE DELIVERY", both filed concurrently herewith, the contents of which are incorporated by reference in their entireties herein.

BACKGROUND

Last mile delivery may involve the delivery of goods to an end point such as a recipient's home. Various computer systems have been developed to aid in the logistics and tracking of the movement of goods through a supply chain and/or delivery chain. These systems may assume that last mile delivery will be the final step in delivering the goods to their recipients. While these systems may be designed to efficiently move goods through the delivery chain and to the last mile, they have been designed to optimize such delivery through the last mile. Thus various computational modeling that have been developed for this purpose may be inflexibly trained, validated, and applied to last mile deliveries.

BRIEF DESCRIPTION OF THE DRAWINGS

Features of the present disclosure may be illustrated by way of example and not limited in the following figure(s), in which like numerals indicate like elements, in which:

FIG. 10 illustrates an example of a method for coordinating, at a pickup location, a hybrid last-mile pickup between a delivery vehicle and customers;

DETAILED DESCRIPTION

Figure 1:
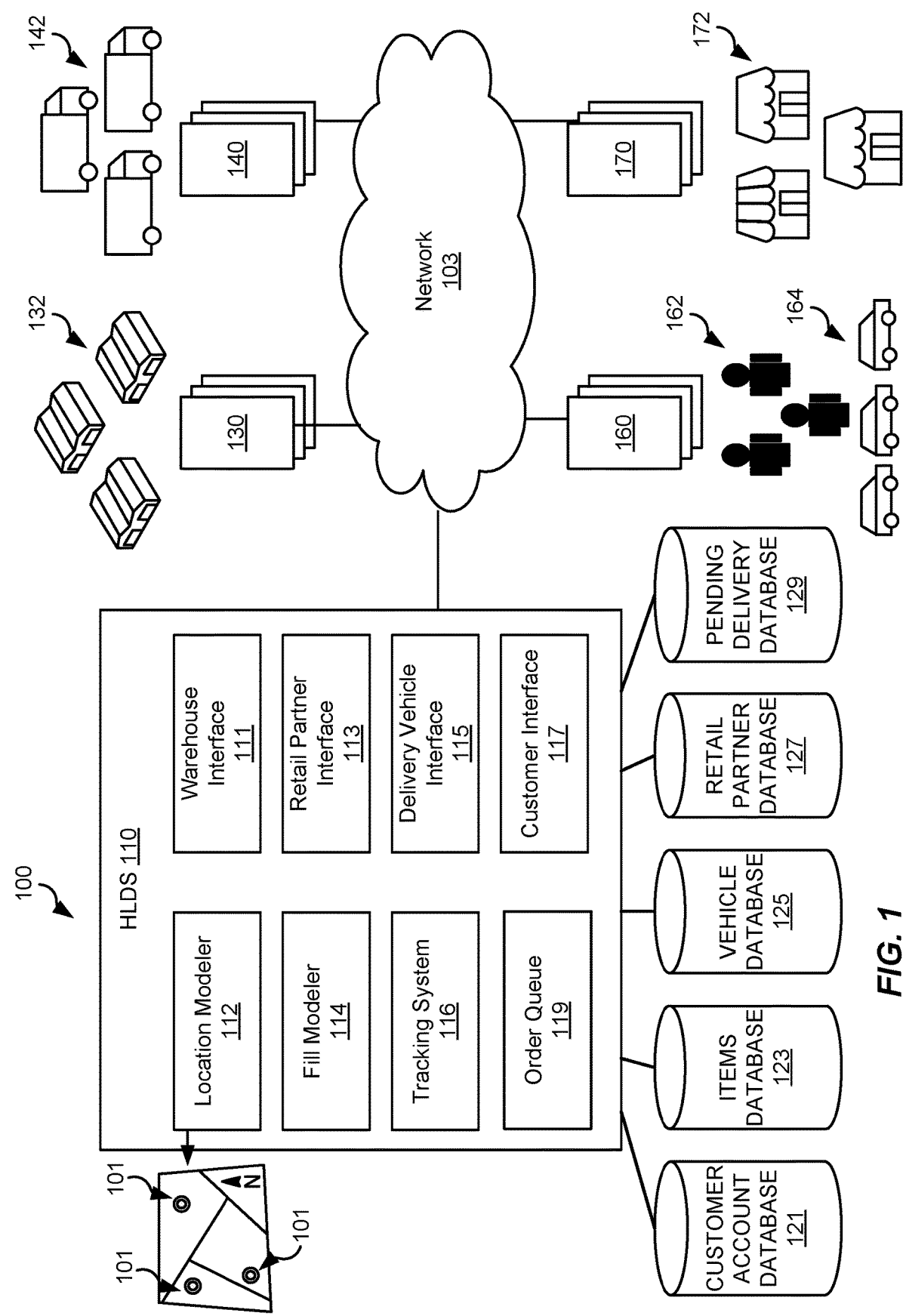
FIG. 1 is a schematic diagram of an example of a system environment for hybrid last-mile delivery.

The disclosure relates systems and methods of computational modeling, interfaces, and fulfillment for hybrid last-mile delivery. Hybrid last-mile delivery may refer to delivery of items in which a delivery vehicle meets customers at a pickup location at a specified time. Thus, instead of conventional last-mile delivery in which a delivery vehicle delivers items to an end point, such as a customer home, customers are to meet the delivery vehicle at a specified location and time to pick up items.

Hybrid last-mile delivery may present various computational problems for location selection, vehicle filling, tracking, and/or other aspects that conventional delivery systems may be unable to handle. For example, location selection may be unneeded in conventional systems since delivery end points are specified by a sender or recipient. Identifying pick up locations may present various data analytics challenges due to the highly variable nature of the available input data, such as vehicle range, customer locations, customer preferences, likelihood of customers not showing up, traffic congestion or other blockages, weather, and/or other variable factors that may impede meeting at a pickup location. Thus, it may be computationally difficult to be able to assess where and/or when pickup locations should be placed or which predefined pickup locations are to be used. Furthermore, it may be difficult to identify how to fill delivery vehicles to optimize hybrid last-mile delivery routes. Additionally, delivery tracking in conventional systems may be unable to track hybrid last-mile deliveries, in which both customers and delivery vehicles en route to potentially dynamically-generated locations may be coordinated.

Various computational modeling that improves delivery systems to address one or more challenges associated with hybrid last-mile delivery may be described herein. For example, the computational modeling may include rules-based modeling, machine-learning (ML) based modeling, and/or other types of computational modeling.

In rules-based modeling, one or more machine-readable rules that specify logic may be stored and accessed by a hybrid last-mile delivery system (HLDS). The HLDS may apply the rules to variable data to automate decision-making for various processes described herein. For example, the HLDS may apply location rules that include criteria to identify or select suitable pickup locations based on variable data available to the HLDS. In this example, the variable data may include locations of distribution centers, range of delivery vehicles, range that customers are willing to travel to meet delivery vehicles, items that are to be delivered and picked up, and/or other variables. In another example, the HLDS may apply fill rules that include criteria to identify items of pickup orders to fill one or more delivery vehicles based on variable data available to the system.

In ML-based modeling, the HLDS may train and validate an ML model to automate decision-making for the various processes described herein. For example, the HLDS may provide data available to the MLDS as input to the ML model, which may output data for automated decision-making. The data available to the MLDS may include data known about customers, items, locations, and/or other variable data to the ML model. In this example, the ML model may output a result used to determine whether a given candidate location is to be selected as a pickup location. For example, the ML model may model variable data and its relationship to a label (also referred to as target) data. The label may include a known good pickup location. A pickup location may be known to be good based on a success rate of completed pickups, feedback information from a driver of a delivery vehicle, feedback information from customers, and/or other indication that a pickup location was a good location. In another example, the HLDS may provide available data to an ML model trained on fill data. In this example, the ML model may output a result used to identify items that should be loaded onto a delivery vehicle.

It should be noted that the rules-based modeling and the ML-based modeling may not necessarily be exclusive, as one type of modeling may be used to inform the other. For example, in the absence of training and validation data, the rules-based modeling may be used for system operation, during which data may be obtained for ML-based modeling. Alternatively, or additionally, both rules-based and ML modeling may be used in combination for automated decision-making, in which case the results of each may be used. For example, the rules-based modeling may output a first range of decisions while the ML-based modeling may output a second range of decisions. Overlapping decisions may be selected. To illustrate this example, the rules-based modeling may output a first set of pickup locations and the ML-based modeling may output a second set of pickup locations. A final pickup location that exists in both the first set and the second set may be selected. Such final pickup location may represent agreement by both the rules-based modeling and the ML-based modeling.

In some examples, various interfaces and backend systems may be improved to provide tracking and fulfillment capabilities that address the unique issues with hybrid last-mile delivery. For example, various interfaces may be improved to simultaneously track the location of both a delivery vehicle and customers that are en route to a pickup location. The various interfaces and systems may be further improved to facilitate customer queuing at the pickup location, pickup tracking and monitoring to determine whether and when pickups were performed, group order tracking, and/or other operations to improve tracking and fulfillment systems.

Having described an overview of various system operations, attention will now turn to systems and methods that facilitate the foregoing and other operations. For example, FIG. 1 is a schematic diagram of an example of a system environment 100 for hybrid last-mile delivery. The system environment 100 may include a hybrid last-mile delivery system (HLDS) 110, a customer account database 121, an items database 123, a vehicle database 125, a retail partner database 127, a pending delivery database 129, a plurality of distribution center devices 130, a plurality of distribution centers 132, a plurality of delivery vehicle devices 140, a plurality of delivery vehicles 142, a plurality of customer devices 160, a plurality of customers 162, a plurality of customer vehicles 164, a plurality of retail partner devices 170, a plurality of retail partners 172, and/or other components.

The HLDS 110 may perform location modeling, perform fill modeling, and provide interfaces and systems for fulfillment tracking for hybrid last-mile delivery to pickup locations 101. A pickup location 101 may refer to a geographically definable location at which customers may meet a delivery vehicle 142 at a specified pickup time to pick up items delivered by the delivery vehicle 142. The pickup time may be defined by a starting time and an ending time in a given day. For example, the pickup time may be specified by a date and a time window. Thus, instead of conventional last-mile delivery in which a delivery vehicle 142 delivers items to individual end points such as a respective home of customers 162, customers 162 are to meet the delivery vehicle 142 at the specified pickup time and pickup location 101.

The customer account database 121 may store customer account identifying information that identifies accounts of customers 162. The customer account identifying information may be stored in association with customer profile information, purchase histories, browsing histories, pending orders, pickup statistics (such as whether a customer picked up orders, whether the customer was late to meet a delivery vehicle 142, and/or other pickup statistics) and/or other information known about a customer 162. The customer profile information may include a customer location, customer location preference information, customer time preference information (indicating a preferred time for pickups), and/or other information of the customer 162. The customer location may identify one or more addresses of the customer 162. The addresses may include a home address, an office address, and/or other location information that identifies the customer location. The customer location preference information may include a preferred static location that the customer 162 wishes to use for a pickup location, an indication of a customer travel range (distance and/or length of time) the customer 162 is willing to travel to a pickup location 101 (whether static or dynamic), an indication of a commuting route that the customer 162 takes and an indication of how far the customer is willing to deviate from this commuting route, and/or other preference of the customer 162 with respect to pickup locations 101. In some examples, the customer location and/or the customer location preference information may be used to identify pickup locations 101 for orders made by the customer 162.

The items database 123 may store item identifying information that identifies items available to be ordered by picked up at a pickup location 101. Such item identifying information may include a stock keeping unit (SKU) identifier or other identifier that may identify an item. Item identifying information may be stored in association with metadata that describes the item. Such metadata may include a size, a weight, a physical dimension (such as width, length, depth), type (refrigerated item, meat item, dairy item, staple item, and/or other description of the type of item), and/or other characteristic of the item.

The vehicle database 125 may store vehicle identifying information that identifies delivery vehicles 142. The vehicle identifying information for a delivery vehicle 142 may be stored in association with vehicle metadata that describes the delivery vehicle 142. The vehicle metadata may include a capacity information that describes a fill, weight, and/or other capacity to carry items, a vehicle type indicating a type of vehicle (such as refrigeration vehicle to carry refrigerated items), a delivery range (distance and/or time) of the vehicle, an age of the vehicle, a make/model, and/or other information that describes the delivery vehicle 142.

The retail partner database 127 may store retail partner identifying information that identifies retail partners 172. Such retail partner identifying information for a retail partner 172 may be stored in association with a retail account of the retail partner 172. The retail account may include a retail location such as one or more addresses of the retail partner 172, a purchase history, pending orders, and/or other information associated with the retail partner 172.

The plurality of distribution center devices 130 may be used at respective ones of the plurality of distribution centers 132. A distribution center 132 may refer to a facility from which items may be picked up by a delivery vehicle 142 for a hybrid last-mile delivery. There may be other, upstream facilities (not illustrated) in the delivery chain as well. Each distribution center device 130 may be used to interact with the HLDS 110 such as through the warehouse interface 111.

The plurality of delivery vehicle devices 140 may be used at respective ones of the plurality of delivery vehicles 142. Each delivery vehicle device 140 may be used to interact with the HLDS 110 such as through the delivery vehicle interface 115.

The plurality of customer devices 160 may be used by respective ones of the plurality of customers 162, who may operate the plurality of customer vehicles 164 to meet a delivery vehicle 142 at a pickup location 101. Each customer device 160 may be used to interact with the HLDS 110 such as through the customer interface 117.

The plurality of retail partner devices 170 may be used by respective ones of the plurality of retail partners 172. Each retail partner device 170 may be used to interact with the HLDS 110 such as through the retail partner interface 113.

Candidate Static and Dynamic Locations for Location Modeling

Figure 2:
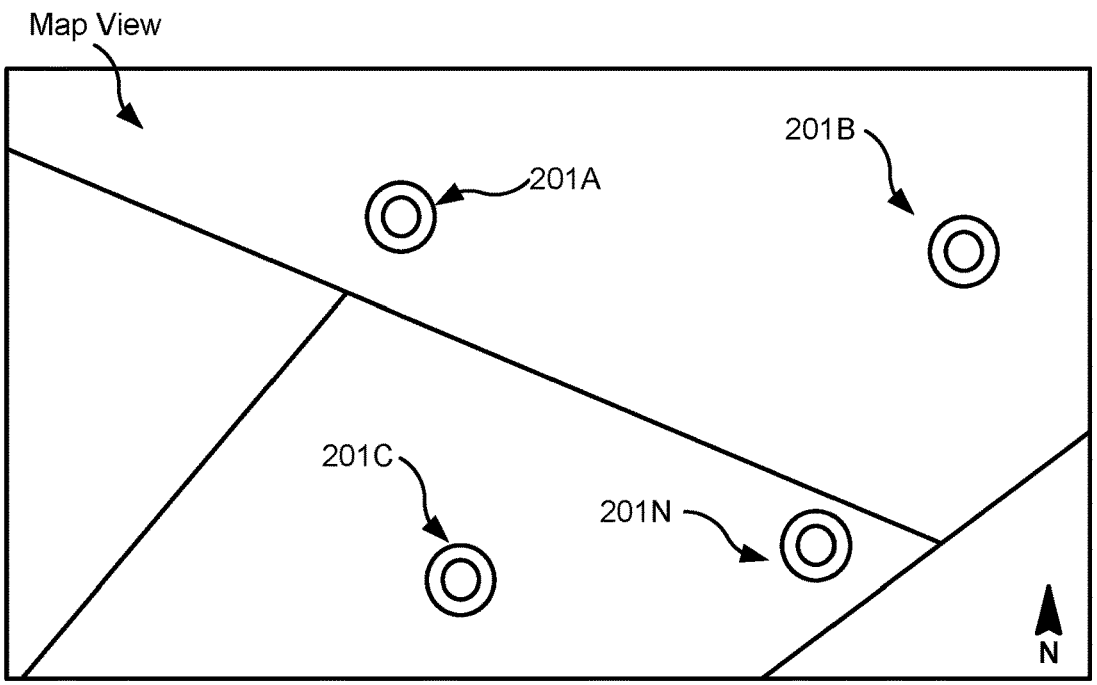
FIG. 2 is a schematic diagram of an example of candidate static locations that are predefined.

The HLDS 110 may select a pickup location 101 from among a plurality of candidate static locations and/or candidate dynamic locations. A candidate static location may refer to a predefined geographically definable location that is available for selection as a pickup location 101. For example, referring to FIG. 2, four candidate static locations 201A-N are illustrated in a map view 200, although other numbers of candidate static locations may be used. A candidate static location 201 may include a predefined address or other geographically definable location. In some examples, a candidate static location 201 may include an address of a retail partner 172 or other partner that agrees to use its location as a candidate static location 201. For example, a restaurant or other business may permit the HLDS 110 to use its parking lot as a candidate static location 201. In some examples, the HLDS 110 may access a previously stored indication of the plurality of candidate static locations 201, and select from among the plurality of candidate static locations 201 to serve as a pickup location 101.

A candidate dynamic location may refer to a geographically definable location that is identified based on pickup orders and locations of customers 162 that transacted the pickup orders. Thus, the term "dynamic location" may refer to a location that may be identified in real-time without being predefined. Thus, whereas the HLDS 110 may identify a candidate dynamic location 301 to serve as a pickup location 101, the HLDS 110 may select a candidate static location 201 from among a plurality of predefined candidate static locations 201 to serve as a pickup location 101.

Figure 3:
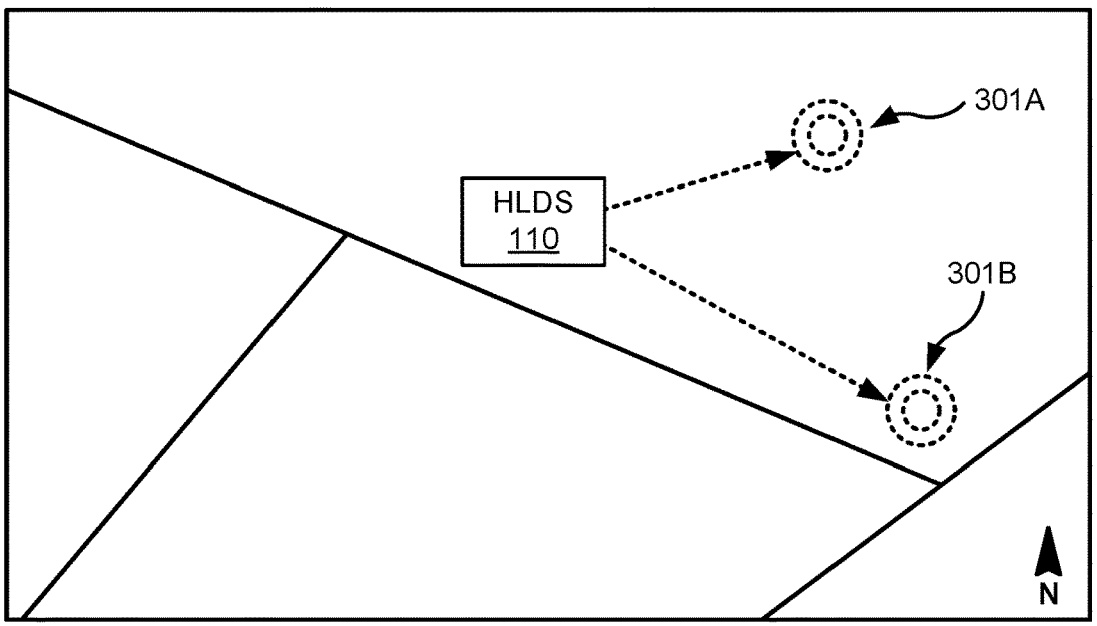
FIG. 3 is a schematic diagram of an example of candidate dynamic locations that are identified in real-time based on current pickup orders.

For example, referring to FIG. 3, two candidate dynamic locations 301A,B are illustrated although different numbers of candidate dynamic locations 301 may be used. The HLDS 110 may dynamically identify a pickup location 101 by identifying various candidate dynamic locations 301A,B through location optimization or other technique, as will be described herein. It should be noted that over time a candidate dynamic location 301 may become a candidate static location 201. For example, if the HLDS 110 repeatedly identifies a candidate dynamic location 301 as a pickup location 101, the system may store the candidate dynamic location 301 as a candidate static location 201.

Hybrid Last-Mile Delivery Routes

In some examples, the HLDS 110 may identify one or more pickup locations 101 of a hybrid delivery route for a delivery vehicle 142. A hybrid delivery route may refer to one or more pickup locations 101 at which a delivery vehicle 142 is to meet a first set of customers 162 A-C at respective pickup times to deliver orders to the first set of customers 162A-C.

Figure 4A:
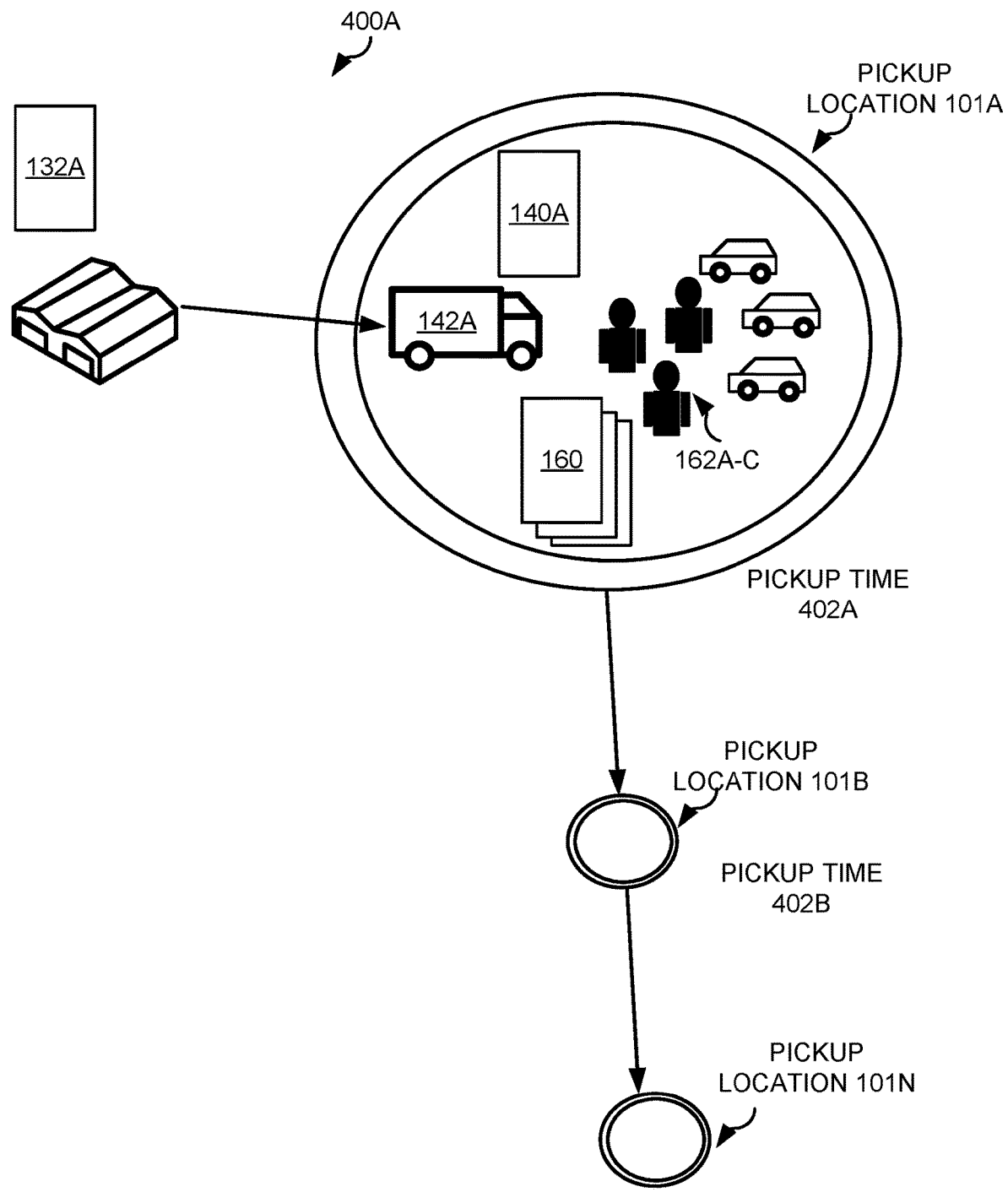
FIG. 4A is a schematic diagram of an example of generating a hybrid delivery route that can include one or more pickup locations for a delivery vehicle to meet one or more customers.

For example, FIG. 4A is a schematic diagram of an example of generating a hybrid delivery route 400A that can include one or more pickup locations for a delivery vehicle to meet one or more customers. As illustrated, a hybrid delivery route 400A may involve a delivery vehicle 142 loading orders from a distribution center 132, traveling to a pickup location 101A where the delivery vehicle 142 is to meet customers 162A-C at pickup time 402A, and providing the orders to the customers 162A-C. In some examples, as illustrated, the delivery vehicle 142 may next travel to a second pickup location 102B, where the delivery vehicle 142 is to meet with a second set of customers 162 (not illustrated) at a second pickup time 402B. Likewise, the delivery vehicle 142 may next travel to other pickup locations 101N, which may include combined conventional last mile deliveries or only hybrid last-mile deliveries.

Figure 4B:
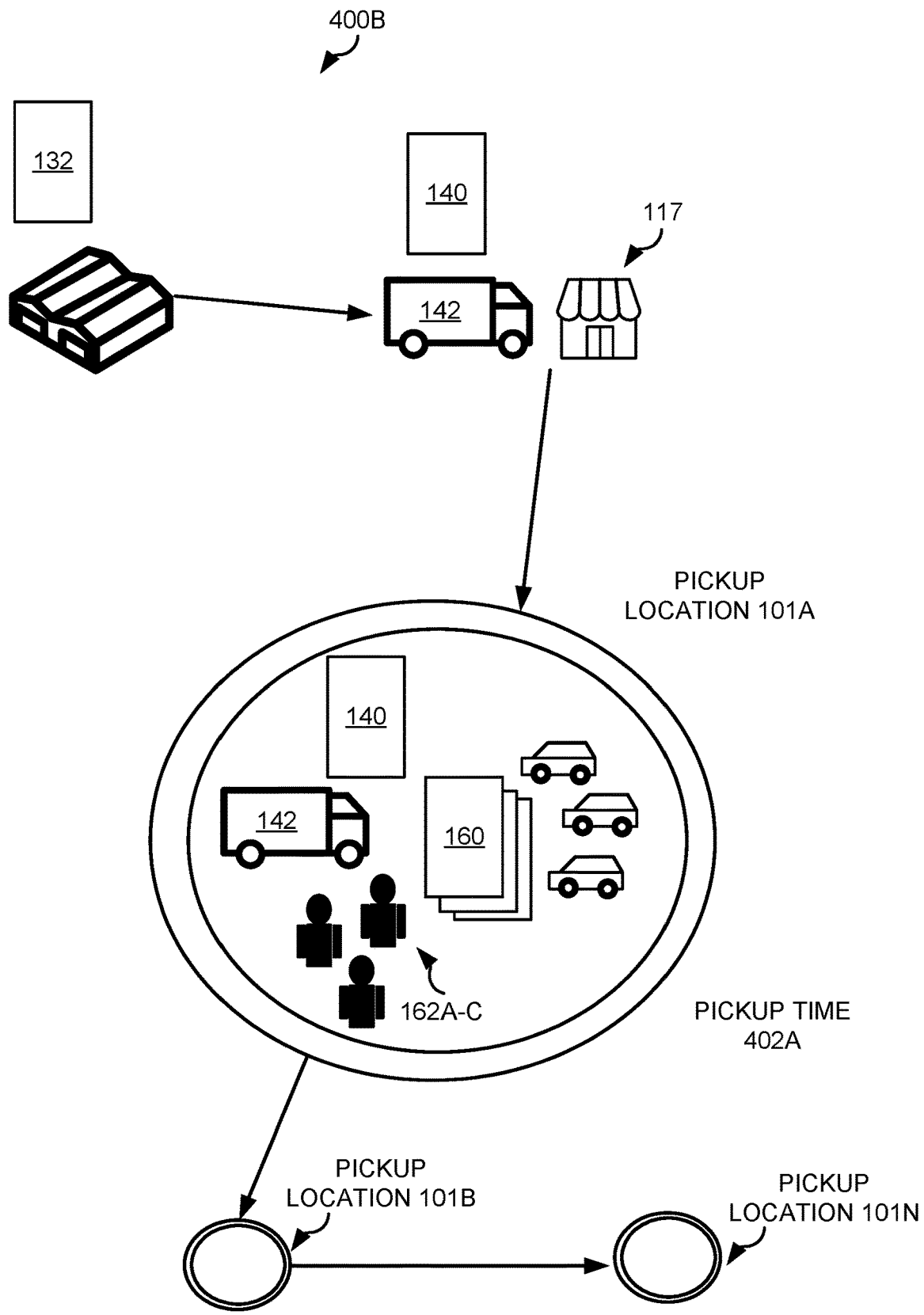
FIG. 4B is a schematic diagram of an example of generating a combination hybrid delivery route that can include one or more pickup locations for a delivery vehicle in which at least one pickup location includes a delivery to a retail partner.

In some examples, a hybrid delivery route may include other deliveries, including conventional last-mile deliveries as well. For example, FIG. 4B is a schematic diagram of an example of generating a combination hybrid delivery route 400B that can include one or more pickup locations 101 for a delivery vehicle 142 in which at least one pickup location includes a delivery to a retail partner 172. As illustrated, a hybrid delivery route 400B may involve a delivery vehicle 142 loading orders from a distribution center 132 and traveling to a retail partner 172 where the delivery vehicle 142 makes a conventional last-mile delivery to the retail partner 172. The delivery vehicle 142 may next travel to a pickup location 101A where the delivery vehicle 142 is to meet customers 162A-C at pickup time 402A, and provide the orders to the customers 162A-C. The delivery vehicle 142 may travel to other pickup locations 101B-N, which may include combined conventional last mile deliveries or only hybrid last-mile deliveries, at respective pickup times as well. In some examples, the delivery to the retail partner 172 may be taken into account when identifying at least the pickup location 101A. For example, the HLDS 110 may weight a candidate location (whether static or dynamic) for selection as pickup location 101A based on proximity of the candidate location to the retail partner 172.

Figure 4C:
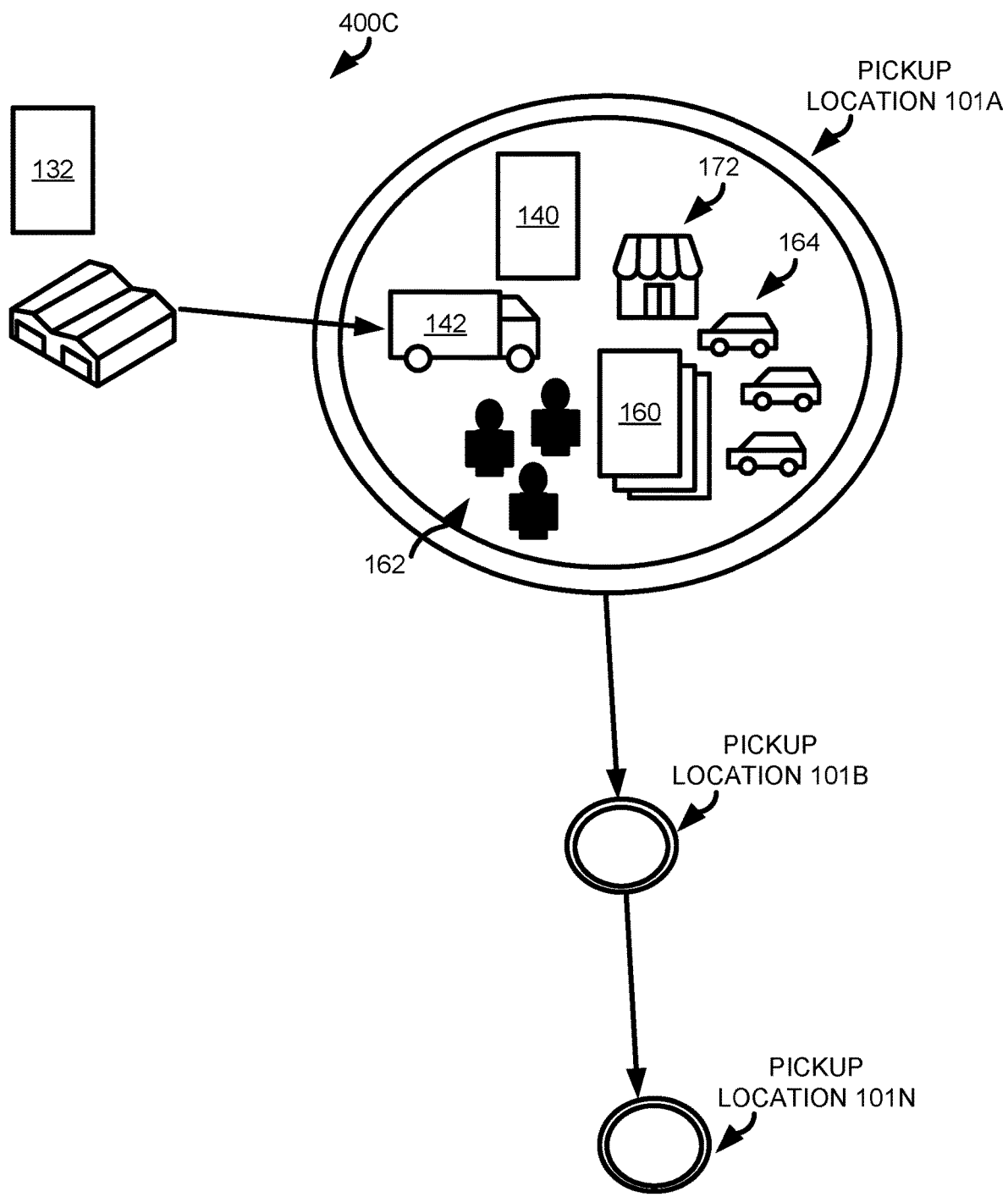
FIG. 4C is a schematic diagram of an example of generating a combination hybrid delivery route that can include one or more pickup locations for a delivery vehicle in which at least one pickup location includes a delivery to a retail partner and customers are to meet the delivery vehicle at the retail partner.

In some examples, a hybrid delivery route may use a conventional last-mile delivery location as a pickup location 101. For example, FIG. 4C is a schematic diagram of an example of generating a combination hybrid delivery route 400C that can include one or more pickup locations 101 for a delivery vehicle 142 in which at least one pickup location 101A includes a delivery to a retail partner 172 and customers 162 are to meet the delivery vehicle 142 at the retail partner 172. In this example, the HLDS 110 may leverage a conventional delivery with hybrid last-mile delivery by having customers 162 meet the delivery truck at the retail partner 172 at a specified pickup time 401. In some example, the hybrid delivery route 400C may include other pickup locations 101B-N as well, which may include combined conventional last mile deliveries or only hybrid last-mile deliveries.

Having described an overview of pickup locations 101, attention will now turn to various computational modeling that the HLDS 110 may perform and apply to determine the pickup locations 101 and determine fill levels of delivery vehicles 142, as well as improved interfaces and systems for fulfillment tracking.

The HLDS 110 may perform location modeling to identify a pickup location 101 from among the candidate static locations 201 and/or candidate dynamic locations 301 (which may be dynamically identified for potential selection). For example, the HLDS 110 may perform location modeling to select which one of the candidate static locations 201 at which a delivery vehicle 142 is to meet a customer 162 for a respective pickup order. For candidate dynamic locations 301, the HLDS 110 may perform location modeling to identify a candidate dynamic location 301 at which a delivery vehicle 142 is to meet a customer 162 for a respective pickup order. Location modeling may take into account retail partners 172 that may receive conventional last-mile delivery orders and also serve as a pickup location 101. For example, the HLDS 110 may schedule delivery of items to a retail partner 172, which may be a restaurant or other brick-and-mortar retailer or delivery recipient, which also agrees to permit the HLDS 110 to use a parking lot of the restaurant as a possible pickup location 101.

Once a pickup location 101 has been identified, the HLDS 110 may perform fill modeling to cause a delivery vehicle 142 to be filled with items of pickup orders at a distribution center 132. Once the delivery vehicle 142 has been filled, the HLDS 110 may provide improved interfaces and backend tracking systems that facilitate hybrid last-mile delivery tracking.

To facilitate the foregoing, the HLDS 110 may include a location modeler 112, a fill modeler 114, a tracking system 116, and/or other components. The HLDS 110 may interact, via a communication network 103, with various devices (such as the distribution center devices 130, the delivery vehicle devices 140, the customer devices 160, and retail partner devices 170) respectively via a warehouse interface 111, a retail partner interface 113, a delivery vehicle interface 115, and a customer interface 117.

In operation, orders may be received from customers 162 via the customer interface 117. In some examples, orders from retail partners 172 may be received via the retail partner interface 113. An order may refer to a transaction in which one or more items have been identified for delivery. As such, when an order is referred to as to be delivered at a pickup location 101, such delivery refers to delivery of the one or more items in the order. In some examples, orders from customers 162 and orders from retail partners 172 may be stored in an order queue 119. The order queue 119 may be processed for customers 162 and retail partners 172 together as a single queue. In other examples, the order queue 119 may be processed separately for customers 162 and retail partners 172. In other words, for purposes of modeling described herein, the customer orders may be processed only with other customer orders and the retail partner orders may be processed with other retail partner orders. In other examples, for purposes of modeling described herein, the customer orders may be processed together with the retail partner orders.

Location Modeling

The location modeler 112 may perform computational modeling to identify pickup locations 101 and pickup times for a delivery vehicle 142 and customers 162 to meet one another to respectively deliver and pick up a respective order in a hybrid last-mile delivery system. Such computational modeling may be rules-based, intelligent based on machine-learning, and/or other include other computational logic to identify pickup locations 101. The location modeling may be driven by various modeling targets (such as classification labels for classification-based modeling) that define desired outcomes. For example, modeling targets may include minimizing fuel consumption by the delivery vehicles 142, maximizing convenience of the customers 162 (by minimizing travel distance and/or time for the customers), minimizing costs for delivery, maximize safety of such hybrid last-mile deliveries, and/or other targets.

Rules-Based Location Modeling

In some examples, the location modeler 112 may trigger selection of a candidate static location 201 and/or candidate dynamic location 301 when one or more machine-readable threshold location rules have been satisfied, such as when a delivery vehicle 142 is: able to be "filled" to a threshold capacity, able to be filled with a certain quantity of goods (count and/or weight), able to be filled with a dollar amount (measured as net, gross, or other), and/or other threshold location rule has been satisfied.

In some examples, the location modeler 112 may apply one or more machine-readable location rules to select or identify pickup locations 101. A location rule may refer to logic, applied by the location modeler 112, to select a pickup location 101, a pickup time, and/or other aspect of an order pickup. A pickup time may refer to a date, a specific time window, and/or other temporal indication of when a delivery vehicle 142 and customers 162 are to meet at the pickup location 101 for hybrid last-mile delivery of orders. The location modeler 112 may apply one or more location rules to data obtained from the order queue 119, customer account database 121, items database 123, vehicle database 125, retail partner database 127, and/or other data source to identify a pickup location 101 and/or pickup time.

Figure 5:
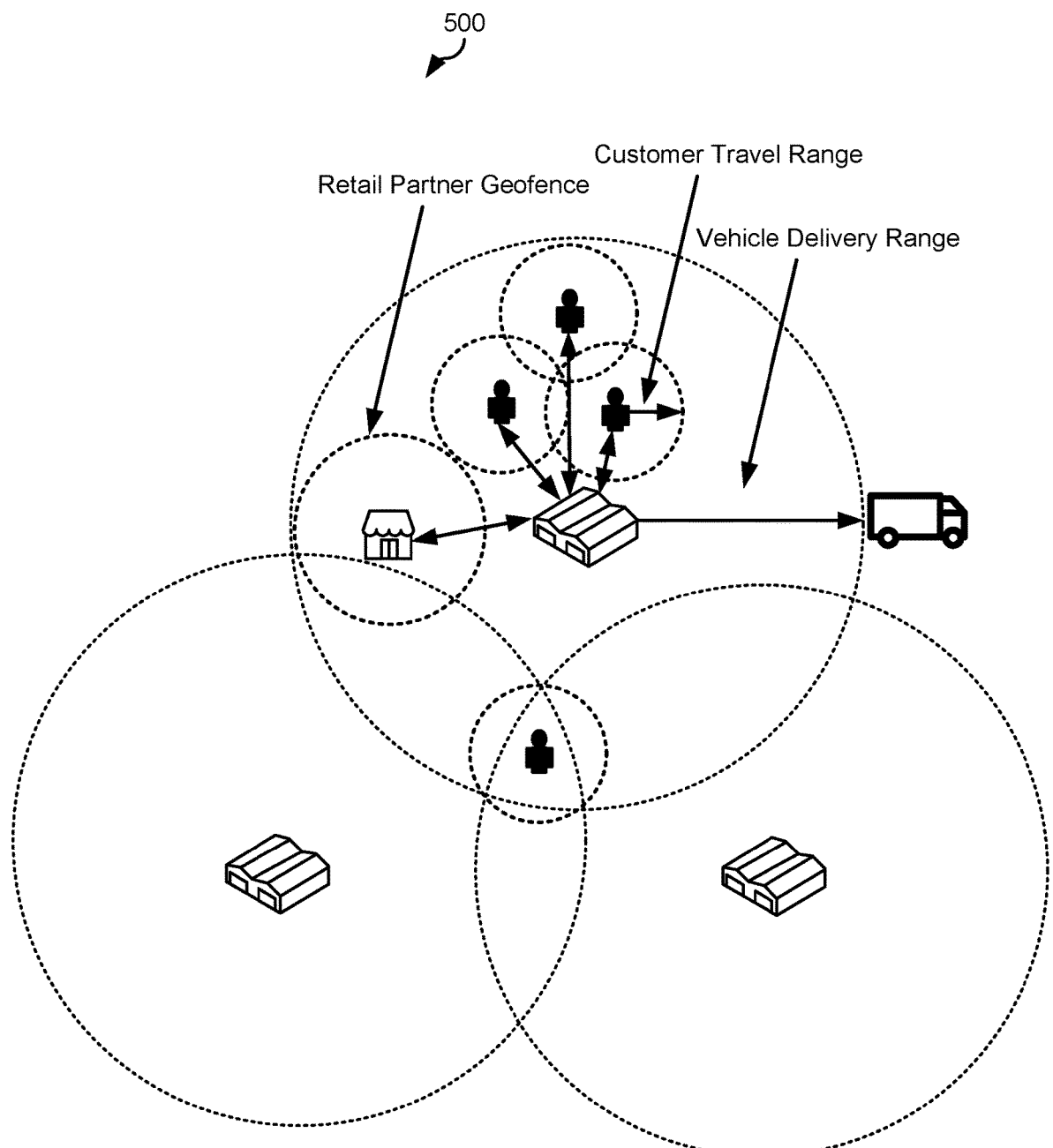
FIG. 5 is a schematic diagram of an example of identifying pickup locations.

For example, a first location rule may specify that a pickup location 101 be within a predefined travel range (illustrated by dotted lines in the schematic diagram 500 of FIG. 5) specified by a given customer 162. A second location rule may specify that a certain number of items in the order queue 119 be required to make a delivery to a pickup location 101. A third location rule may specify that a delivery range of a delivery vehicle 142 (illustrated in FIG. 5) is sufficient to travel from a distribution center 132 to a selected pickup location 101 with a predefined amount of buffer. A fourth location rule may specify that a delivery range of a delivery vehicle 142 is sufficient to travel from a distribution center 132 to a selected pickup location 101 and one or more other pickup locations 101 with a predefined amount of buffer. A fifth location rule may specify that a pickup location 101 be within a geofence of a retail partner (illustrated in FIG. 5). A sixth location rule may specify a maximum distance or time to travel if refrigerated items are to be delivered. For example, if a delivery vehicle 142 is a non-refrigerated, then the sixth location rule may specify that a candidate location be within a maximum distance or travel time for the delivery vehicle 142 to minimize spoilage. In some examples, the location modeler 112 may apply one or more location rules (either a single rule or two or more rules in combination) to identify a pickup location 101. Various other types of location rules may be specified such that when applied by the location modeler 112, a pickup location 101 may be selected or identified.

In some examples, a location rule may specify that the pickup time be at least a minimum length of time, a maximum length of time, and/or other specification of time. The minimum length of time may be specified as a function of number of items, number of customers 162 for a given pickup location 101, and/or other parameter.

In some examples, all applied location rules may have to be satisfied for the location modeler 112 to select a pickup location 101 from among the candidate static locations 201 or candidate dynamic locations 301. In other examples, a certain number or percentage of the location rules may have to be satisfied for the location modeler 112 to select a pickup location 101. In still other examples, the location modeler 112 may apply a score to a candidate static location 201 and/or candidate dynamic location 301, where such score may indicate a suitability of the location to serve as a pickup location 101. Such score may be based on the ranking previously described. In some examples, one location rule may be deemed to be more important than others. For example, the number of items for orders in the order queue 119 may be deemed to be more important than a travel distance for customers to a pickup location (or vice versa). Accordingly, some or all of the applied location rules may be weighted to reflect such level of importance. The weighting may be used to generate a location score for a candidate static location 201 and/or candidate dynamic location 301.

In operation, the location modeler 112 may, at various times, evaluate the plurality of candidate static locations 201 against one or more of the location rules and the orders in the order queue 119. For example, for a first candidate static location 201, the location modeler 112 may access the orders in the order queue 119, evaluate one or more location rules to determine whether the first candidate static location 201 meets the criteria to be selected as a pickup location, and selects the first candidate static location 201. Otherwise, if the first candidate static location 201 does not meet the criteria, as specified by the one or more applied rules, then the location modeler 112 may not select the first candidate static location 201. In some examples, the location modeler 112 may continue evaluating other ones of the plurality of candidate static location 201 while there remain orders to be fulfilled in the order queue 119. In some examples, such location modeling may be performed in a round-robin fashion in which each of the plurality of candidate static location 201 is evaluated in series and is selected as it meets the criteria specified by the applied location rules. In other examples, the location modeler 112 may perform such location modeling for each of the plurality of static locations first and then generate a location score for each of the plurality of candidate static locations 201 that meet the criteria. The location modeler 112 may then rank the plurality of candidate static locations 201 based on their respective location scores. In this manner, only top-ranking ones of the candidate static locations 201 may be selected. Such ranking may be based on the number of rules that were satisfied by a given candidate static location 201 (where higher ranked candidate static locations 201 satisfy more rules than lower ranked candidate static locations 201), a quality of such satisfaction (for example, a candidate static location 201 that is closer to the relevant customers 162 will be ranked higher than one that is further from the relevant customers 162), and/or other ranking criteria.

For candidate dynamic locations 301, the location modeler 112 may apply the machine-readable rules in a similar manner, except that such rules may be applied to locations that are not predefined. In these examples, the location modeler 112 may identify a set of candidate dynamic locations 301 to be evaluated against the location rules. To identify the candidate dynamic locations 301, the location modeler 112 may analyze customer location and/or customer location preference information for orders to be delivered. Such analysis may include identifying a set of seed locations based on the customer location and/or customer location preference information. A seed location may refer to a known location that may be known to be suitable as a potential pickup location 101. Such suitability may be based on availability of a sufficient space such as a parking lot, availability of travel route, and/or other factors that may indicate a seed location is accessible to a delivery vehicle 142. The seed locations may be identified from a public business listing and/or other database of addresses. In some examples, seed locations may be curated and entered into a database of seed locations (not illustrated). A seed location may differ from a candidate static location 201 in that the seed location may not be designated as a candidate static location 201 selectable by a customer 162 for pickup. Rather, a seed location may include any known suitable location that may potentially serve as a pickup location.

The location modeler 112 may select a set of seed locations based on proximity to customer locations and/or customer location preference information. For example, referring to FIG. 5, an intersection of customer travel ranges (illustrated as dashed circles) may be used to identify a seed location. In another example, a set of zip codes or other customer location information may be used to identify a seed location. Once a seed location is selected, the location modeler 112 may evaluate each seed location by applying the location rules to the seed location.

ML-Based Location Modeling

In some examples, the location modeler 112 may train, validate, and apply a location model to select or identify pickup locations 101. The location model may be trained to output a first probability that the candidate static location 201 and/or candidate dynamic location 301 is a suitable pickup location 101. In some examples, the location model may further output a second probability that the candidate static location 201 and/or candidate dynamic location 301 is not a suitable pickup location 101. In this sense, the location model may be a classifier that classifies a candidate static location 201 and/or candidate dynamic location 301 as being a suitable pickup location 101 and/or not a suitable pickup location 101.

For example, to train and validate the location model, the location modeler 112 may access labels that identify a suitable pickup location and/or not a suitable location. In one-class classification (OCC), there may be a single label identifying a suitable pickup location may be used. In binary classification, two labels may be used: a first label identifying a suitable pickup location and a second label identifying a not suitable pickup location. The labels may be based on input from a system operator, feedback data from customers 162, feedback data from operators of delivery vehicles 142, successful pickups (such as a percentage or number of successful pickups versus no-shows by customers) at a pickup location (where smaller percentage of pickups may equate with less suitability), amount of time for delivery at the pickup location (where longer times may equate with less suitability), identification of customers 162 involved in the delivery order, and/or other sources of known good (or bad) pickup locations.

Once the labels are identified and accessed, the location modeler 112 may train the location model against delivery order data representing actual hybrid last-mile deliveries to pickup locations 101 labeled as suitable and/or not suitable. In this manner, the location modeler 112 may learn features that have a relationship with the pickup location 101 labeled as suitable and/or unsuitable. Put another way, the location modeler 112 may learn parameters in delivery order data that may correlate with the suitable and/or unsuitable pickup locations 101. The delivery order data may include data indicating a distance and/or time traveled by each customer 162, a distance and/or time traveled by a delivery vehicle 142, identification of customers 162, identification of operators of delivery vehicles 142, identification of delivery vehicles 142, identification of items delivered, weather conditions, traffic conditions at the time of delivery, and/or other data relating to actual hybrid last-mile deliveries. Once the location model has been trained, a portion of the training data (such as 20%) may be reserved for validation in which the reserved validation data is used to assess the performance of the location model.

Once trained, the location model may be used on actual data from the order queue 119 to evaluate whether a candidate static location 201 and/or candidate dynamic location 301 (such as through aforementioned location seeds) is suitable for selection or identification as a pickup location 101 for orders in the order queue 119. For example, data indicating a distance and/or time to be traveled by each customer 162 to the candidate static location 201 and/or candidate dynamic location 301, a distance and/or time to be traveled by a delivery vehicle 142 to the candidate static location 201 and/or candidate dynamic location 301, identification of customers 162 involved in an order to be delivered, identification of operators of delivery vehicles 142, identification of delivery vehicles 142, identification of items to be delivered, weather conditions, traffic conditions at the time of delivery, and/or other data relating to the order queue 119.

Figure 6:
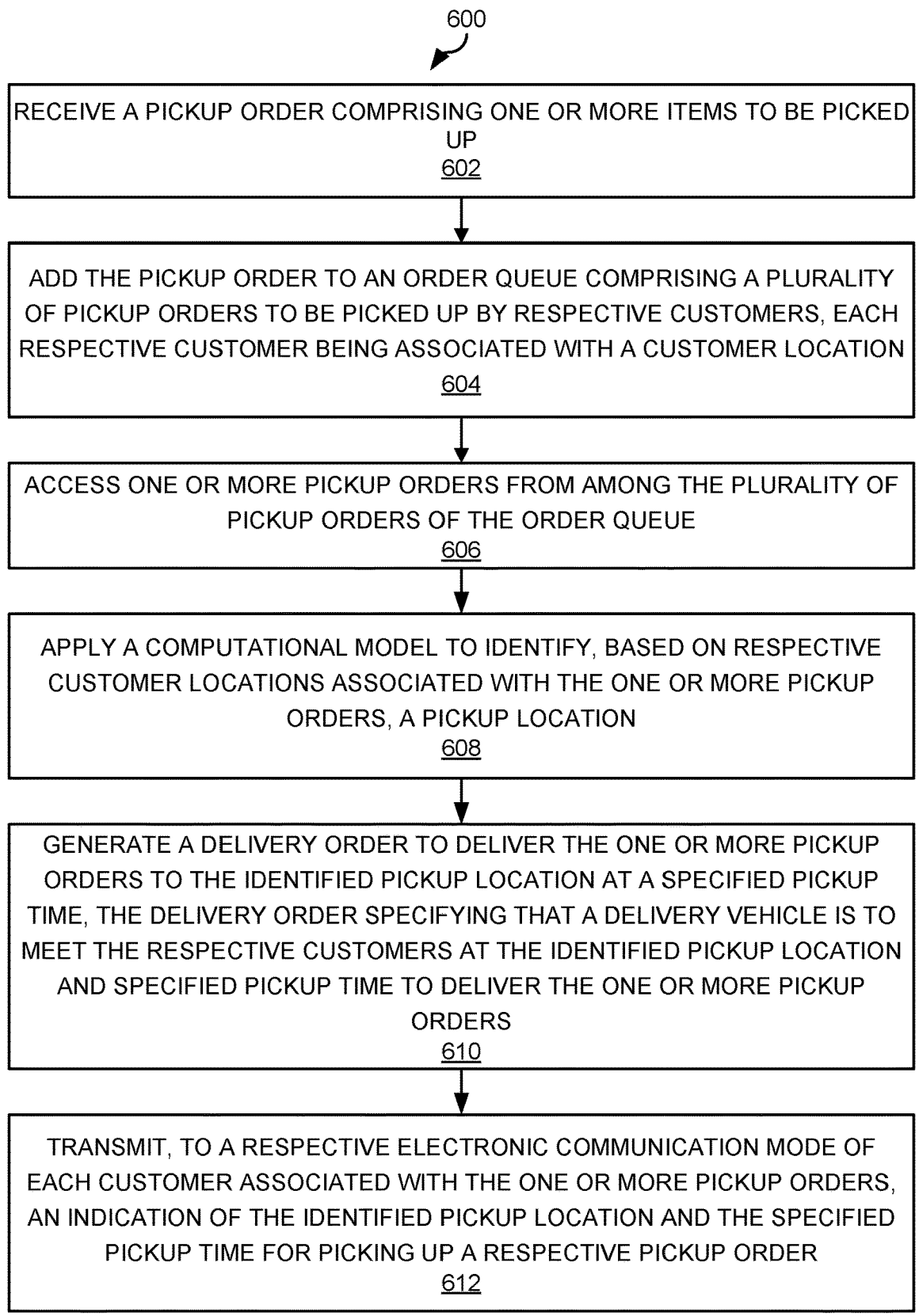
FIG. 6 illustrates an example of a method for identifying pickup locations for pickup orders.

FIG. 6 illustrates an example of a method 600 for identifying pickup locations for pickup orders. The method 600 may be implemented by the HLDS 110 or other computer system described herein.

At 602, the method 600 may include receiving a pickup order comprising one or more items to be picked up.

At 604, the method 600 may include adding the pickup order to an order queue (such as order queue 119 illustrated in FIG. 1) comprising a plurality of pickup orders to be picked up by respective customers (such as customers 162), each respective customer being associated with a customer location.

At 606, the method 600 may include accessing one or more pickup orders from among the plurality of pickup orders of the order queue.

At 608, the method 600 may include applying a computational model to identify, based on respective customer locations associated with the one or more pickup orders, a pickup location (such as a pickup location 101) at which the one or more pickup orders is to be picked up by respective customers. The computational model may be generated and applied based on the computational modeling described with respect to the location modeler 112 illustrated in FIG. 1.

At 610, the method 600 may include generating a delivery order to deliver the one or more pickup orders to the identified pickup location at a specified pickup time, the delivery order specifying that a delivery vehicle (such as delivery vehicle 142) is to meet the respective customers at the identified pickup location and the specified time to deliver the one or more pickup orders. The delivery order may be stored in a pending deliveries database 129.

At 612, the method 600 may include transmitting, to a respective electronic communication mode of each customer associated with the one or more pickup orders, an indication of the identified pickup location and the specified pickup time for picking up a respective pickup order. The communication mode may include an in-app notification, a Short Message System text message, an electronic mail address, and/or other communication mode of each customer.

In some examples, the pickup location is identified from among a plurality of candidate dynamic locations (such as candidate dynamic locations 301A,B) that are not predefined as a pickup location. In these examples, identifying the pickup location may include identifying a geographic location, from among the plurality of candidate dynamic locations, based on a distribution travel path from a distribution center to the geographic location, and a plurality of customer travel paths to the geographic location, each customer travel path comprising a travel path from a respective customer location to the geographic location, wherein the pickup location is identified based on the selected geographic location.

In some examples, identifying the geographic location may include determining a centrality location based on the distribution travel path and the plurality of customer travel paths. For example, various ones of the candidate dynamic locations may be evaluated to identify a candidate dynamic location having the lowest average centrality between the distribution travel path and the plurality of customer travel paths. For example, the location modeling may select a candidate dynamic location being the most central to the distribution center 132 and the customers 162.

In some examples, the pickup location may be selected from among a plurality of static locations that are each predefined and designated as a pickup location. In some of these examples, identifying the pickup location may be based on at least one customer selection of the plurality of candidate static locations to serve as the pickup location. For example, in connection with placing an order, a customer may indicate that a particular pickup location (which is a candidate static location) be used. The pickup location may be guided by the customer selection (such as selecting a nearby location based on the location modeling or using the customer-selected location).

In some examples, the method 600 may include grouping the one or more pickup orders with a retail order to be delivered to a retail partner. In these examples, the delivery vehicle 142 may combine a last-mile delivery to a retail partner 172 with the one or more pickup orders. Thus, the method 600 may include determining a retail address of the retail partner and identifying the pickup location for the one or more orders based further on the retail address. For example, the retail address may be used as the pickup location or the pickup location may be selected to be within a certain proximity of the retail address. In some examples, the method 600 may include weighting scores for candidate locations (such as candidate static locations 201 or candidate dynamic locations 301) as a function of proximity to the retail address. In this manner, candidate locations that are closer to the retail address may be weighted higher than candidate locations further from the retail address.

In some examples, the method 600 may further include applying an ML model to identify a retail partner (such as retail partner 172) that is predicted to be of interest to a first customer associated with one of the grouped one or more pickup orders. For example, the machine-learning model may be trained based on orders to identify items in the orders that have a relationship with the retail partner. In particular, the machine-learning model may be trained based on information that customers who visit the retail partner or otherwise are known to have an affinity for the retail partner also tend to purchase certain items and/or have other customer characteristic. Thus, if the first customer also purchases the certain items, then the model may determine that the first customer will also have an affinity for the retail partner.

In these examples, the method 600 may include transmitting, to the electronic communication mode of the first customer, a recommendation relating to the retail partner (such as an incentive to visit the retail partner). The recommendation may include an indication that the first customer will likely have an affinity for the retail partner (for examples in which the first customer is not known to already have such affinity), an incentive for the retail partner, an indication of similar retail partners that the first customer may also be interested in, and/or other information relating to the retail partner. Thus, because the pickup location in these examples may be close to or at the retail location, the first customer may be incented to visit the retail partner before or after meeting the delivery vehicle 142 to pick up an order.

In some examples, the method 600 may further include receiving, from a first customer associated with a first pickup order from among the grouped one or more pickup orders, customer location preference information specifying a preferred time or location to pick up the first pick up order, and identifying the pickup location based at least in part on the customer location preference information. In these examples, the candidate locations (static or dynamic) may be scored based further on the customer location preference information. For example, a given candidate location may be weighted as a function of proximity to customer location preference information. The candidate locations may be weighted based on an aggregate of the proximities to available customer location preference information (where such availability depends on whether a given customer has provided customer location preference information). For example, a first candidate location may be within one mile of a first customer's customer location preference information and within five miles of a second customer's customer location preference information. A second candidate location may be within two miles of the first customer's customer location preference information and within three miles of a second customer's customer location preference information. The first and second candidate locations may be weighted based on an aggregation of the respective proximities to the first and second customer location preference information. For example, the first candidate location may be weighted based on an aggregated sum of six miles (one plus five) or an aggregated average of three miles and the second candidate location may be weighted based on an aggregated sum of five miles or an aggregated average of 2.5 miles. Thus, because of the closer proximity of the second candidate location, the method 600 may include weighting the second candidate location higher than the first candidate location for scoring purposes.

In some examples, the method 600 may include selecting the one or more pickup orders from among the plurality of pickup orders for modeling in various ways. For example, the method 600 may include accessing customer time preference information of the respective customers associated with the plurality of pickup orders, and selecting the one or more pickup orders from among the plurality of pickup orders to be delivered to the pickup location based on the time preference information. In this manner, a pickup location and specified pickup time may be selected based on customers having similar preferences for when to make a pickup.

In some examples, the method 600 may further include identifying items from the plurality of orders in the order queue that will fill the delivery vehicle and selecting the one or more pickup orders from among the plurality of pickup orders to be delivered to the pickup location based on the identified items. In this manner, orders may be grouped to be delivered to the pickup location based on the identified items (such as to group similar items together for a given pickup location).

In some examples, the method 600 may further include accessing customer locations associated with the plurality of pickup orders and select the one or more pickup orders from among the plurality of pickup orders to be delivered to the pickup location based on the respective customer locations. In this manner, orders of customers who are geographically near to one another may be grouped together for purposes of identifying a pickup location.

In some examples, the method 600 may further include selecting the specified pickup time based on when a delivery truck is expected to be filled or is filled. For example, the specified pickup time may be determined when a delivery vehicle is identified that will be filled to capacity with orders and/or after the delivery vehicle is expected to be filled to capacity with orders. Such prediction may be based on modeling in which time of year, season, or other factors may be used to predict order volume at a given time.

In some examples, the method 600 may include revising the specified pickup time or the pickup location based on one or more new orders added to the plurality of pickup orders in the order queue, and transmitting the revised pickup time or the revised pickup location to the respective electronic communication mode of each customer associated with the grouped one or more pickup orders. For example, such revisions may be based on additional orders (where additional orders may move up the specified time and/or change the pickup location and canceled orders may move back the specified time and/or change the pickup location).

In some examples, the method 600 may further include transmitting first pickup order identifying data (such as an order code) to a first customer associated with a first pickup order from among the grouped plurality of pickup order, the pickup order identifying data being used to identify the first pickup order at the pickup location, and transmitting the first pickup order identifying data to the delivery vehicle that is to deliver the first pickup order to the pickup location, the first pickup order identifying data being used at the delivery vehicle to locate and validate the first pickup order based on a comparison of pickup order identifying data provided by the first customer and the pickup order identifying data transmitted by the system. In this manner, the delivery vehicle may have the order codes of all orders to be delivered by the delivery vehicle.

In some examples, the method 600 may further include receiving, from the delivery vehicle, an indication that the first pickup order was picked up, and storing an indication that the first pickup order was picked up in association with a first customer account associated with the first customer.

In some examples, the method 600 may further include receiving an indication that a delivery of the grouped one or more pickup orders to the pickup location is in progress, identifying the delivery vehicle that is providing the delivery to the pickup location and a current location of the delivery vehicle, and transmitting, to each electronic communication mode of each customer associated with the grouped one or more pickup orders, information identifying the delivery vehicle and the current location of the delivery vehicle.

In some examples, the method 600 may further include receiving an indication that a delivery of the grouped one or more pickup orders to the pickup location is in progress, accessing a current location of each of one or more customers associated with the grouped one or more pickup orders, and transmitting, to the delivery vehicle (such as via a delivery vehicle device 140), the current location of each of one or more customers associated with the grouped one or more pickup orders. Such transmission may be in the form of a GUI, such as GUI 1200.

Figure 7:
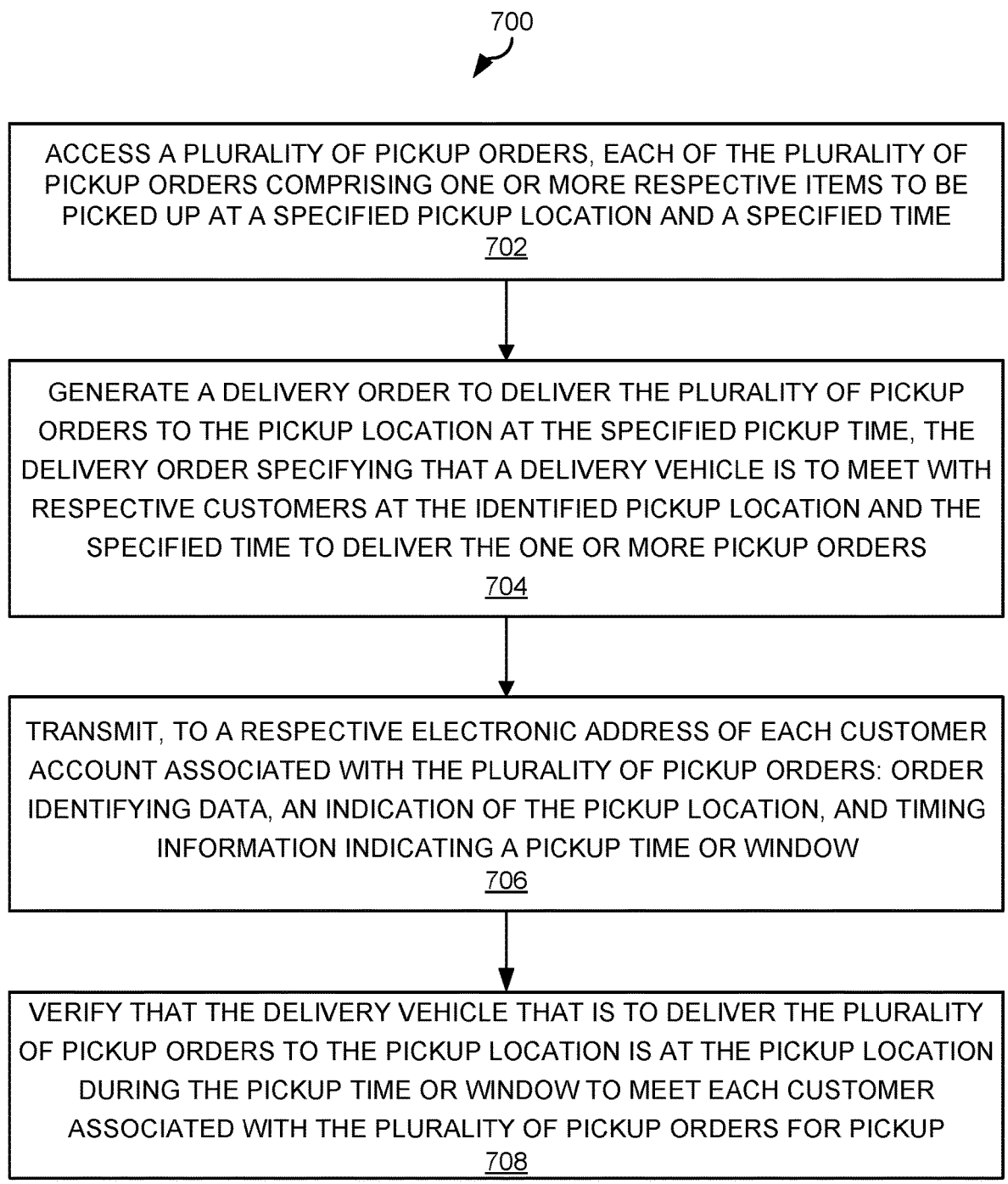
FIG. 7 illustrates an example of a method for arranging pickup orders for hybrid last-mile delivery.

FIG. 7 illustrates an example of a method 700 for arranging pickup orders for hybrid last-mile delivery. The method 700 may be implemented by the HLDS 110 or other computer system described herein.

At 702, the method 700 may include accessing a plurality of pickup orders, each of the plurality of pickup orders comprising one or more respective items to be picked up at a specified pickup location (such as a pickup location 101 illustrated in FIG. 1) and a specified pickup time. In some examples, the method 700 may include identifying the pickup location automatically without customer input such as through the use of automated location modeling described herein.

At 704, the method 700 may include generating a delivery order to deliver the plurality of pickup orders to the pickup location at the specified pickup time, the delivery order specifying that a delivery vehicle (such as delivery vehicle 142) is to meet with respective customers (such as customers 162) at the identified pickup location and the specified time to deliver the one or more pickup orders. At 706, the method 700 may include transmitting, to a respective electronic address of each customer account associated with the plurality of pickup orders: order identifying data, an indication of the pickup location, and timing information indicating a pickup time or window. At 708, the method 700 may include verifying that the delivery vehicle that is to deliver the plurality of pickup orders to the pickup location is at the pickup location during the pickup time or window to meet each customer associated with the plurality of pickup orders for pickup.

Fill Modeling

In some examples, the fill modeler 114 may apply one or more machine-readable fill rules to select or identify orders (items of the orders) that are to be loaded into a delivery vehicle 142. A fill rule may refer to logic, applied by the fill modeler 114, to select a delivery vehicle 142 and/or orders to fill the delivery vehicle 142. The location modeler 112 may apply one or more fill rules to data obtained from the order queue 119, customer account database 121, items database 123, vehicle database 125, retail partner database 127, and/or other data source.

For example, a first fill rule may specify that a delivery vehicle 142 be filled to a minimum threshold capacity. The minimum threshold capacity may refer to a number, weight, or volume of items that may be loaded onto the delivery vehicle 142. A second fill rule may specify a maximum capacity, which may refer to a number, weight, or volume of items. A third fill rule may specify that a type of delivery vehicle 142 be used for certain types of items. For example, a refrigerated vehicle may be required for refrigerated goods, certain length or sized delivery vehicle 142 may be required for certain sized items, and/or other vehicle requirements may be specified. A fourth fill rule may specify that items be loaded into the delivery vehicle 142 in a certain order. For example, items may be filled according to an order queue provided to customers 162. Such order queue, as described herein elsewhere, may be based on a customer score or likelihood that the customer 162 will show up at the pickup location 101. Such customer score may be generated based on a number of orders picked up, a number of orders not picked up (such as canceled or no-show), a dollar amount of purchases made, a timeliness or tardiness of the customer in arriving at a pickup location, a frequency of orders made, and/or other metric that may assess a value of the customer 162. Various other types of fill rules may be specified such that when applied by the fill modeler 114, a delivery vehicle 142 and/or fill level may be identified. In some examples, the fill modeler 114 may apply one or more fill rules (either a single rule or two or more rules in combination) to identify a delivery vehicle 142 and/or fill level.

In some examples, all applied fill rules may have to be satisfied for the fill modeler 114 to select a fill level and/or a delivery vehicle 142 from among a plurality of available vehicles. In other examples, a certain number or percentage of the fill rules may have to be satisfied for the fill modeler 114 to select a fill level and/or delivery vehicle 142. In still other examples, the fill modeler 114 may apply a vehicle score to a delivery vehicle 142, where such vehicle score may indicate a suitability of the delivery vehicle 142 to deliver a set of orders. A highest scoring delivery vehicle 142 may be selected to deliver the set of orders.

In operation, the fill modeler 114 may, at various times, evaluate a plurality of delivery vehicles 142 against one or more of the fill rules and the orders in the order queue 119. It should be noted that selection of delivery vehicles 142 to delivery orders may be changed from time to time as new orders are submitted or canceled by customers 162 and/or retail partners 172. For example, a larger delivery vehicle 142 may be selected to accommodate a set of orders that are already assigned to a delivery vehicle 142 and a new order if the current delivery vehicle 142 is not large enough to deliver the new order as well. Likewise, a smaller delivery vehicle 142 may be selected to replace the current delivery vehicle 142 if orders are canceled. Notifications of any such delivery vehicle 142 may be transmitted to relevant customer devices 160. In some examples, new or canceled orders may also affect the pickup location 101 and/or pickup time, in which case notifications may also be transmitted to relevant customer devices 160.

ML-Based Fill Modeling

In some examples, the fill modeler 114 may train, validate, and apply a fill model to identify fill levels and/or delivery vehicles 142. The fill model may be trained to output a first probability that a fill level and/or delivery vehicle 142 is a suitable fill level and/or delivery vehicle 142. In some examples, the fill model may further output a second probability that the fill level and/or delivery vehicle 142 is not a suitable fill level and/or delivery vehicle 142. In this sense, the fill model may be a classifier that classifies a fill level and/or delivery vehicle 142 as being a suitable fill level and/or delivery vehicle 142.

For example, to train and validate the fill model, the fill modeler 114 may access labels that identify a suitable fill level and/or delivery vehicle 142. In one-class classification (OCC), there may be a single label identifying a suitable fill level and/or delivery vehicle 142. In binary classification, two labels may be used: a first label identifying a suitable fill level and/or delivery vehicle 142 and a second label identifying a not suitable fill level and/or delivery vehicle 142. The labels may be based on input from a system operator, feedback data from customers 162, feedback data from operators of delivery vehicles 142, amount of time for delivery at the pickup location (where longer times may equate with less suitability since this may indicate improper fill levels or selected delivery vehicles 142), amount of time to load or unload the delivery vehicles 142, and/or other sources of known good (or bad) fill levels and/or delivery vehicles 142.

Once the labels are identified and accessed, the fill modeler 114 may train the fill model against delivery order data representing actual hybrid last-mile deliveries with known fill levels and/or delivery vehicles 142. In this manner, the fill modeler 114 may learn features that have a relationship with the fill levels and/or delivery vehicles 142 labeled as suitable and/or unsuitable. Put another way, the fill modeler 114 may learn parameters in delivery order data that may correlate with the suitable and/or unsuitable fill level and/or delivery vehicle 142. The delivery order data may include data indicating a distance and/or time traveled by each customer 162, a distance and/or time traveled by a delivery vehicle 142, identification of customers 162, identification of operators of delivery vehicles 142, identification of delivery vehicles 142, identification of items delivered, weather conditions, traffic conditions at the time of delivery, and/or other data relating to actual hybrid last-mile deliveries. Once the fill model has been trained, a portion of the training data (such as 20%) may be reserved for validation in which the reserved validation data is used to assess the performance of the fill model.

Once trained, the fill model may be used on actual data from the order queue 119 to evaluate whether a fill level and/or delivery vehicle 142 is suitable for orders in the order queue 119. For example, data indicating a distance and/or time to be traveled by each customer 162 may correlate with fill levels because a combination of overly high fill level and distance traveled may equate with an unsatisfactory experience for a customer 162, a distance and/or time to be traveled by a delivery vehicle 142 to the pickup location 101 (this may indicate too many or too little items have been loaded onto the delivery vehicle based on travel distance since more loaded items may tend to result in less overall travel time and stops), identification of customers 162 involved in an order to be delivered, identification of operators of delivery vehicles 142, identification of delivery vehicles 142, identification of items to be delivered, weather conditions, traffic conditions at the time of delivery, and/or other data relating to the order queue 119.

Figure 8:
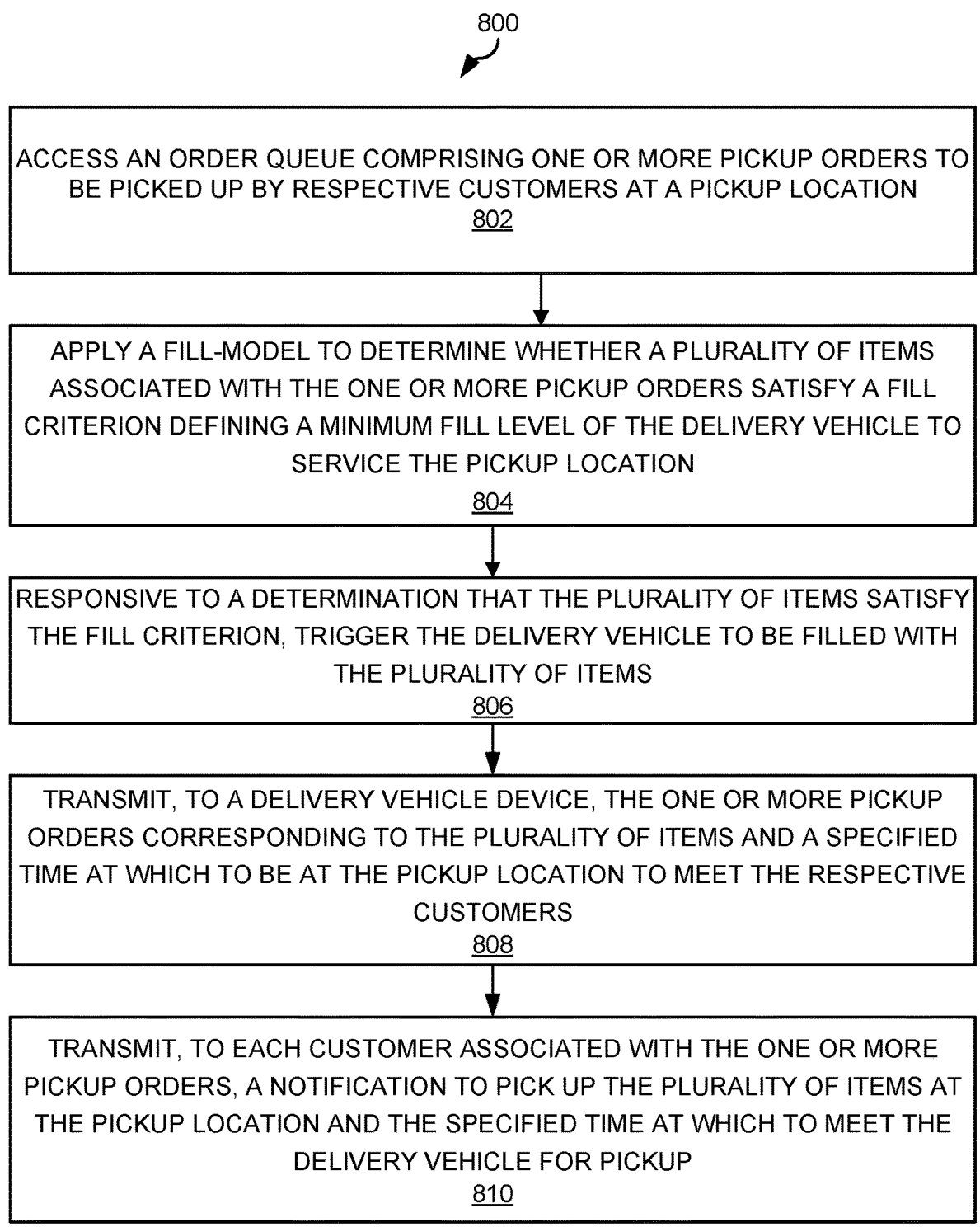
FIG. 8 illustrates an example of a method for filling a delivery vehicle for hybrid last-mile delivery.

FIG. 8 illustrates an example of a method 800 for filling a delivery vehicle (such as delivery vehicle 142 illustrated in FIG. 1) for hybrid last-mile delivery. The method 800 may be implemented by the HLDS 110 or other computer system described herein.

At 802, the method 800 may include accessing an order queue (such as order queue 119) comprising one or more pickup orders to be picked up by respective customers (such as customers 162) at a pickup location.

At 804, the method 800 may include applying a fill-model to determine whether a plurality of items associated with the one or more pickup orders satisfy a fill criterion defining a minimum fill level of the delivery vehicle to service the pickup location. At 806, the method 800 may include, responsive to a determination that the plurality of items satisfy the fill criterion, triggering the delivery vehicle to be filled with the plurality of items. In some examples, if a delivery vehicle will be triggered for filling upon addition of items, the method 800 may include providing an incentive to customers to purchase items that would fill the delivery vehicle.

At 808, the method 800 may include transmitting, to a delivery vehicle device, the one or more pickup orders corresponding to the plurality of items and a specified time at which to be at the pickup location to meet the respective customers. At 810, the method 800 may include transmitting, to each customer associated with the plurality of pickup orders, a notification to pick up the plurality of items at the pickup location and the specified time at which to meet the delivery vehicle for pickup.

In some examples, the fill-model includes a rules-based model. In these examples, applying the fill-model may include accessing one or more machine-readable fill rules that specify the fill criterion, the fill criterion specifying a minimum number of items, a minimum value of items, a minimum volume of items to consider the delivery vehicle to be filled, and determining whether the plurality of items satisfy the one or more fill rules. For example, the method 800 may include iterating through the one or more orders to identify different sets of items to be evaluated against the one or more fill rules.

In some examples, the fill-model may include an ML model. In these examples, applying the fill-model may include provide, as input to the ML model, the plurality of items, and determining, based on an output of the ML model, that the identified plurality of items satisfies the fill criterion. For example, the ML model is trained to identify items that will likely fit within the delivery vehicle based on prior deliveries. In some examples, the ML model is trained to identify items that will likely be picked up without cancelations based on prior deliveries.

In some examples, the method 800 may include, prior to the determination that the plurality of items satisfies the fill criterion, determining that a previously evaluated plurality of items, from among the plurality of items, did not satisfy the fill criterion, identifying one or more items that, when added to the previously evaluated plurality of items, will satisfy the fill criterion, identifying one or more customers that may be interested in the identified one or more items, and transmitting, to the identified one or more customers, a recommendation to add the identified one or more items.

In some examples, the method 800 may include, after the determination that the plurality of items satisfies the fill criterion, receive an indication that an item in the plurality of items has been canceled from a pickup order (or the entire pickup order may have been canceled), identifying one or more customers that may be interested in the canceled item or a replacement item, and transmitting, to the identified one or more customers, a recommendation to add the canceled item or the replacement item.

In some examples, the plurality of items includes retail items to be delivered to a retail partner at a retail address. In these examples, the method 800 may include, setting a delivery route for the delivery vehicle, the delivery route including the pickup location and the retail address.

In some examples, the method 800 may include, determining that the delivery vehicle is over-capacity, identifying one or more items that would address the over-capacity, transmitting an incentive to a customer associated with the one or more items to accept an alternate pickup location or alternative pickup time. For example, another pickup location and/or another pickup time may be available for the customer and the customer may be incented (such as through a monetary or other incentive) to pick up the customer's pickup order at the alternative pickup location or time.

In some examples, the method 800 may include, determining an arrival order in which customers are predicted to arrive at the pickup location to meet the delivery vehicle, determining a loading order in which a plurality of pickup orders of the customers is to be loaded into the delivery vehicle based on the determined arrival order.

In some examples, the method 800 may include determining, for each customer, a probability that the customer will pick up a respective pickup order at the pickup location and determining a loading order in which a plurality of pickup orders of the customers is to be loaded into the delivery vehicle based on the determined probability determined for each customer.

In some examples, the delivery vehicle is to deliver to the pickup location with a first plurality of pickup orders and a second location with a second plurality of pickup orders. In these examples, the method 800 may include determining a first loading order of the first plurality of pickup orders in a first section of the delivery vehicle, and determining a second loading order of the second plurality of pickup orders in a second section of the delivery vehicle.

Tracking System and Logistics

Figure 9:
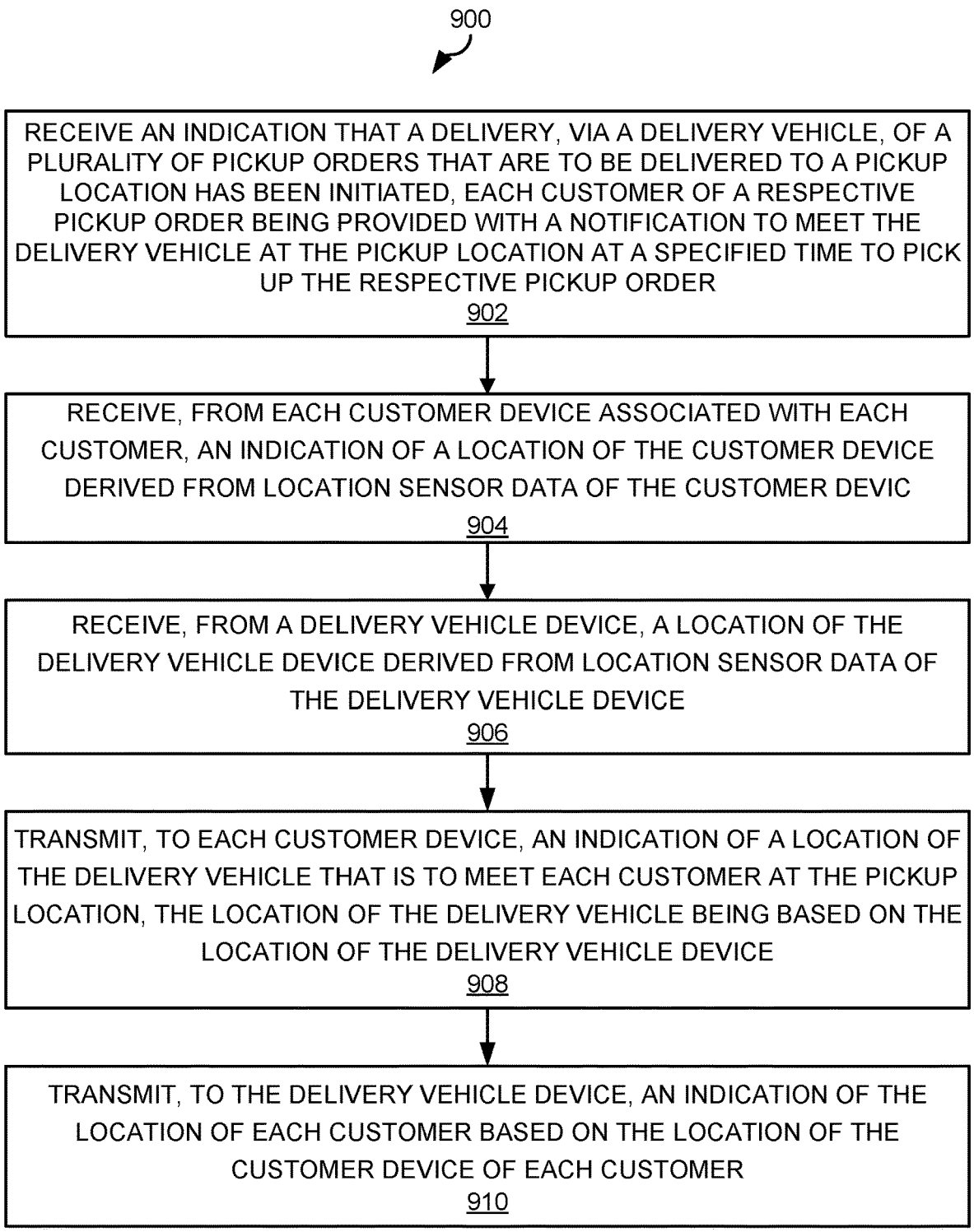
FIG. 9 illustrates an example of a method for triggering and tracking a hybrid last-mile pickup between a delivery vehicle and customers.

FIG. 9 illustrates an example of a method 900 for triggering and tracking a hybrid last-mile delivery between a delivery vehicle (such as a delivery vehicle 142 illustrated in FIG. 1) and customers (such as customers 162). The method 900 may be implemented by the HLDS 110 or other computer system described herein.

At 902, the method 900 may include receive an indication that a delivery, via a delivery vehicle, of a plurality of pickup orders that are to be delivered to a pickup location (such as a pickup location 101) has been initiated. Each customer of a respective pickup order may be provided with a notification to meet the delivery vehicle at the pickup location at a specified time to pick up the respective pickup order.

At 904, the method 900 may include receiving, from each customer device (such as customer device 160) associated with each customer, an indication of a location of the customer device derived from location sensor data (such as GPS sensor data, cell tower triangulation data, and/or other location sensor data) of the customer device. At 906, the method 900 may include receiving, from a delivery vehicle device (such as delivery vehicle device 140), a location of the delivery vehicle device derived from location sensor data (such as GPS sensor data, cell tower triangulation data, and/or other location sensor data) of the delivery vehicle device.

At 908, the method 900 may include transmitting, to each customer device, an indication of a location of the delivery vehicle that is to meet each customer at the pickup location, the location of the delivery vehicle being based on the location of the delivery vehicle device. At 910, the method 900 may include transmitting, to the delivery vehicle device, an indication of the location of each customer based on the location of the customer device of each customer.

In some examples, the method 900 may include accessing, for each customer, an estimated time of arrival to the pickup location and an on-time indicator, and transmitting, to the delivery vehicle, the estimated time of arrival and the on-time indicator. In some of these examples, the method 900 may include generating a pickup queue for the plurality of pickup orders based on the estimated time of arrival of the respective customers, the pickup queue indicating a sequential order in which the respective customers are to pick up a pickup order.

In some examples, the method 900 may include transmitting a pickup queue position in the pickup queue to each respective customer. In some example, the pickup queue positions may change. For example, the method 900 may include receiving updated location data of at least one customer, update the pickup queue based on the updated location data, and transmitting an updated queue position in the updated queue to each customer. For example, a given customer may be running late to the pickup location and that customer's pickup queue position may be accordingly changed, changing the pickup queue position of at least one other customer in the pickup queue.

In some examples, the method 900 may include accessing an estimated time of arrival of the delivery vehicle to the pickup location, transmitting, to each respective customer, the estimated time of arrival of the delivery vehicle.

In some examples, at least a first pickup order comprises a group pickup order that is to be split amongst a plurality of customers. In these examples, the method 900 may include identify a responsible pickup customer for the group pickup order, wherein the location of the delivery vehicle is transmitted to the responsible pickup customer. In some of these examples, the method 900 may include receiving a pickup confirmation indicating that the group pickup order has been picked up by the responsible pickup customer, transmitting, to each group customer in the plurality of group customers, an indication of the pickup confirmation. In some examples, the method 900 may include facilitating payment of an amount due for the group pickup order to be split among the plurality of customers. For example, the method 900 may include charging the responsible pickup person before or after the pickup or charging one or more of the customers in the group before or after the pickup.

In some examples, the method 900 may include receiving, from a first customer from among the plurality of customers, a first confirmation that the first customer received a portion of the group pickup order and storing an indication of the first confirmation. In this manner, the method 900 may include tracking, on behalf of the group, whether each customer in the group has received their portion of the group order that was picked up by the responsible pickup person.

In some examples, the method 900 may include receiving, from the delivery vehicle device, an encoding (such as a QR code, barcode, or other encoding) representing a first pickup order, the encoding being scanned from a first customer device during a pickup of the first pickup order at the pickup location, transmitting, to the delivery vehicle device, identifying information that identifies the first pickup order to facilitate provision of the first pickup order to a first customer, and receiving, from the delivery vehicle device, an indication that the first pickup order has been provided to and picked up by the first customer. In some examples, the method 900 may include receiving a second encoding that represents a scan of a label for the first pickup order.

FIG. 10 illustrates an example of a method 1000 for coordinating, at a pickup location (such as a pickup location 101 illustrated in FIG. 1), a hybrid last-mile delivery between a delivery vehicle (such as a delivery vehicle 142)

and customers (such as customer 162). The method 1000 may be implemented by the HLDS 110 or other computer system described herein.

At 1002, the method 1000 may include receiving an indication that a delivery vehicle is at a pickup location to deliver a plurality of pickup orders to be picked up by a respective customer. For example, the indication may include location sensor data that indicates that the delivery vehicle is within a geofenced area (which may be determined based on a certain radius or other geographically definable boundary) of the pickup location. At 1004, the method 1000 may include receive, from the delivery vehicle device (such as a delivery vehicle device 140), an encoding representing a first pickup order from among the plurality of pickup orders, the encoding being scanned from a first customer device during a pickup of the first pickup order at the pickup location.

At 1006, the method 1000 may include transmitting, to the delivery vehicle device, identifying information that identifies the first pickup order to facilitate provision of the first pickup order to a first customer. At 1008, the method 1000 may include receiving, from the delivery vehicle device, an indication that the first pickup order has been provided to and picked up by the first customer.

Figure 11:
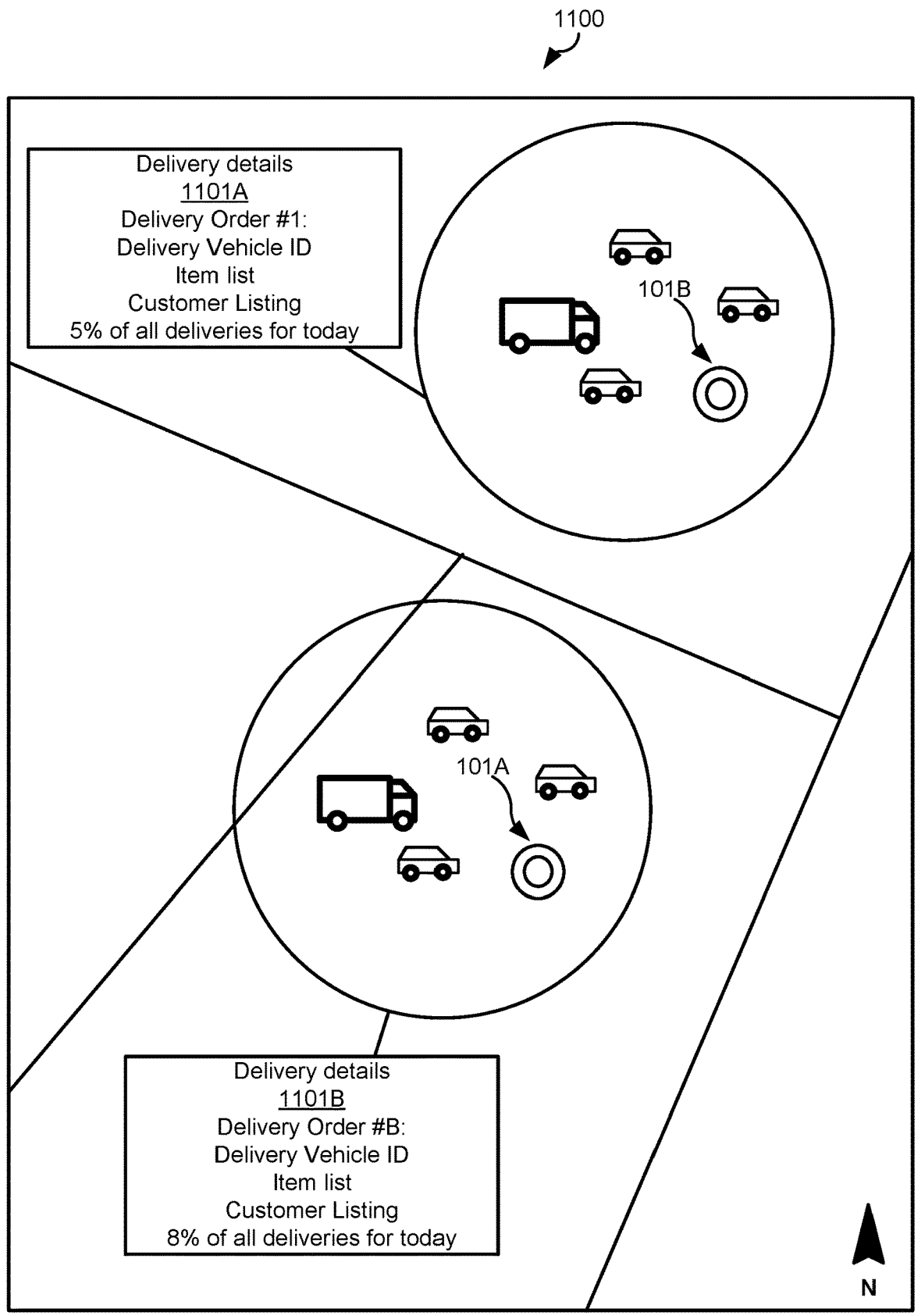
FIG. 11 illustrates a screenshot view of an example of a graphical user interface that provides a fleet view of delivery vehicles and customers en route to respective pickup locations.

FIG. 11 illustrates a screenshot view of an example of a graphical user interface 1100 that provides a fleet view of delivery vehicles 142 and customer vehicles 164 en route to respective pickup locations 101. For example, the HLDS 110 may generate the GUI 1100 for transmission to a management device (not illustrated). The GUI 1100 may provide a management view of hybrid last-mile deliveries in progress. Such GUI 1100 may receive inputs (not illustrated) to select which region to show hybrid last-mile deliveries in progress. In the illustrated example, a region showing two delivery vehicles 142A,B for which hybrid last-mile deliveries are in progress to meet customers at respective pickup locations 101A,B.

To generate the GUI 1100, the HLDS 110 may access delivery details for in progress hybrid last-mile deliveries for each delivery vehicle 142. The HLDS 110 may access current location information for each delivery vehicle 142 and each customer 162 (for customers that permit such location sharing) involved in the in-progress hybrid last-mile deliveries. The location information may include Global Positioning System (GPS) coordinates from GPS sensors onboard the delivery vehicle devices 140 and customer devices 160, location estimates based on triangulation of cell tower connections with the delivery vehicle devices 140 and customer devices 160, and/or other location information that indicates a current location of the delivery vehicle devices 140 and customer devices 160.

The HLDS 110 may generate a map view of the region and include the locations of the delivery vehicles 142A,B and customers 162A-N. For example, the GUI 1100 may include, in the map view, graphical indicia of a location of the delivery vehicles 142A,B and graphical indicia of a location of the customers 162A-N (depicted as vehicle icons as illustrated). In this manner, the GUI 1100 may provide an improved interface showing the delivery vehicles 142 and the customers 162 en route to respective pickup locations 101. It should be noted that the locations may be updated in real-time as new location information is received from the delivery vehicle devices 140 and/or the customer devices 160. In this manner, the GUI 1100 may provide updated locations of the delivery vehicles 142 and/or the customers 162 in real-time (through location information from respective delivery vehicle devices 140 and/or the customer devices 160).

In some examples, the GUI 1100 may further include the delivery details 1101 for each hybrid last-mile delivery depicted in the GUI 1100. For example, delivery details 1101 may include an identification of the order, an identification of the delivery vehicle 142, an item list of the orders being delivered, a customer list of the customers 162 meeting the delivery vehicle 142 at a respective pickup location 101A,B, and an indication of the delivery relative to all deliveries for the day (indicating the proportion of the particular delivery compared to all deliveries for the day). The proportion may provide an indication of the number of items or orders each pickup location 101 contributes to the overall items or orders to be made for the day. Such proportion may be calculated by region, by vehicle, or other overall number. In some examples, the GUI 1100 may further include estimated time of arrivals and/or distance to a pickup location for each of the delivery vehicles 142 and customers 162. In this manner, the GUI 1100 may provide an indication of whether the delivery vehicles 142 and customers 162 will be on time or delayed.

Figure 12:
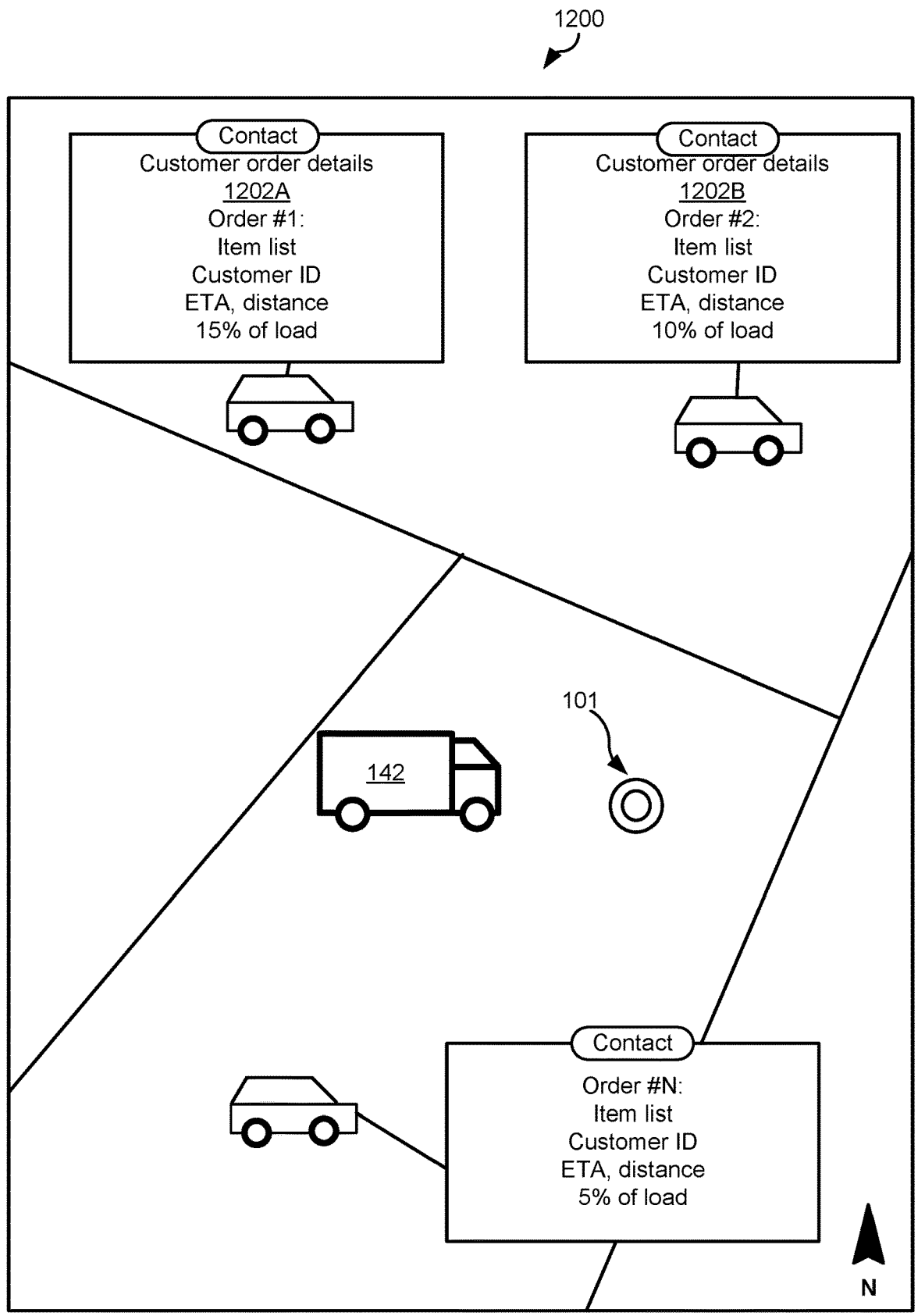
FIG. 12 illustrates a screenshot view of an example of a graphical user interface that provides a delivery vehicle view of customers en route to a next pickup location.

FIG. 12 illustrates a screenshot view of an example of a graphical user interface 1200 that provides a delivery vehicle view of customers 162 en route to a next pickup location 101. The GUI 1200 may be displayed via a delivery vehicle device 140 and used by an operator of the delivery vehicle 142 to show a location of the delivery vehicle 142 and locations of customers 162. In some examples, as illustrated, the HLDS 110 may include, in the GUI 1200, a contact interface object that when selected causes the customer to be contacted, customer order details 1202, which may include an order number, an item list, a customer identifier, an ETA and/or distance to the pickup location 101, a proportion of the customer order with respect to the delivery load for the pickup location 101, and/or other details. The GUI 1200 may therefore be used by the operator of the delivery vehicle 142 to see a status of the location of each customer 162 that is to meet the delivery vehicle 142 at the pickup location 101.

Figure 13:
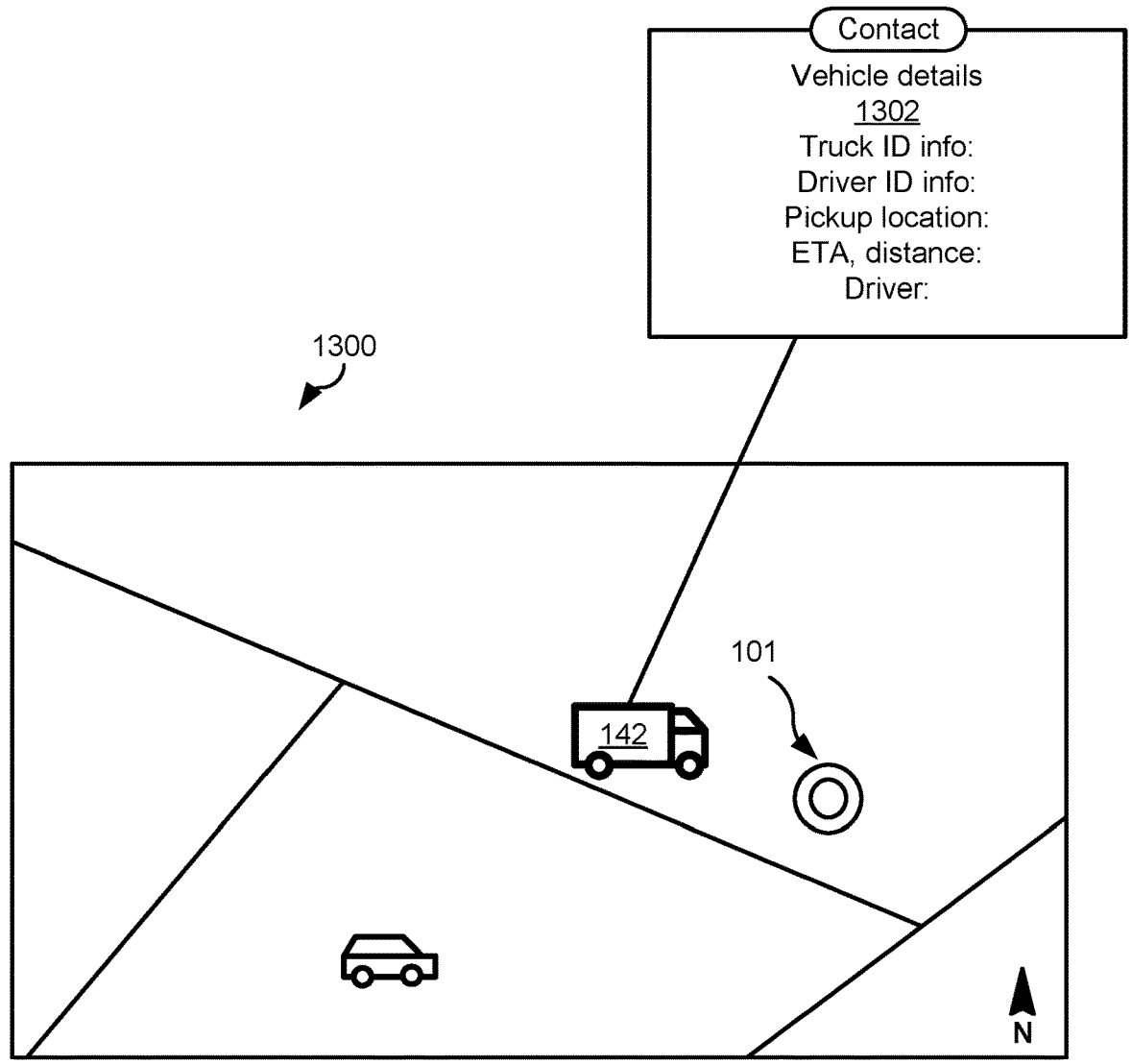
FIG. 13 illustrates a screenshot view of an example of a graphical user interface that provides a customer view of a delivery vehicle en route to a pickup location.

FIG. 13 illustrates a screenshot view of an example of a graphical user interface 1300 that provides a customer view of a delivery vehicle en route to a pickup location 101. The GUI 1300 may be displayed via a customer device 160 and used by the customer 162 to show a location of the customer 162 and a location of the delivery vehicle 142 and vehicle details 1302. In some examples, the GUI 1300 may include a contact interface object that when selected causes the operator of the delivery vehicle 142 to be contacted. In some examples, as illustrated, the HLDS 110 may include in the GUI 1200 vehicle details 1302 such as a vehicle identifier, operator information (such as operator identifier), location of the pickup location 101, an ETA and/or distance of the delivery vehicle 142 to the pickup location 101, and/or other information. The GUI 1300 may also provide ETA and/or distance information from the customer 162 to the pickup location 101. The GUI 1300 may therefore be used by each customer 162 to see a status of the location of the delivery vehicle 142 en route to a pickup location 101 where the customer is to meet the delivery vehicle 142. In some examples, the current location of the delivery vehicle 142 may include information relating to prior pickup locations 101 that the delivery vehicle 142 is to make before the customer's pickup location 101. In this manner, the customer 162 may be able to further gauge the ETA of the delivery vehicle 142 to the customer's pickup location 101.

Figure 14:
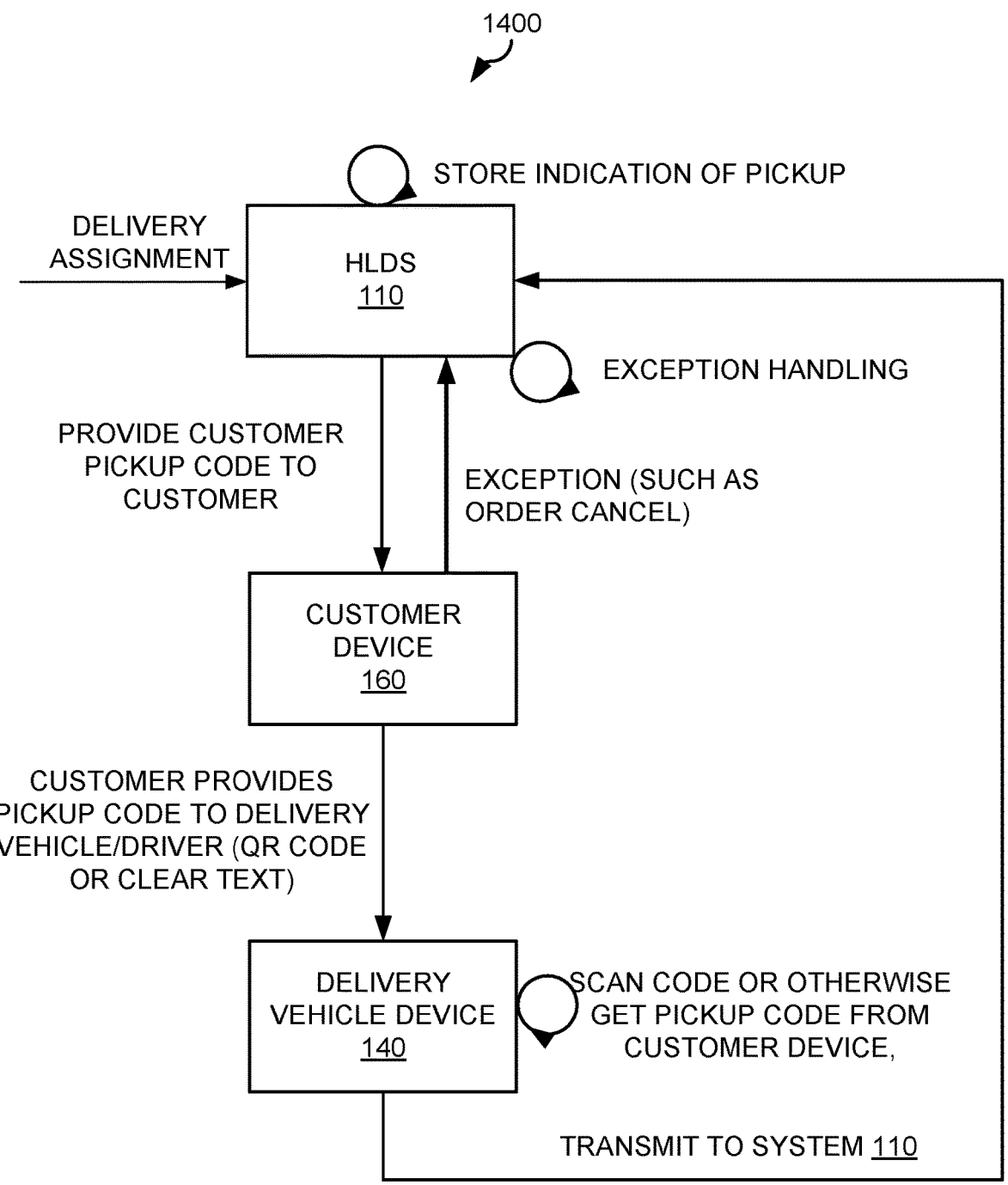
FIG. 14 illustrates a data flow of coordinating and tracking a hybrid last-mile delivery of a hybrid last-mile delivery system.

FIG. 14 illustrates a data flow 1400 of coordinating and tracking a hybrid last-mile delivery of a hybrid last-mile delivery system, such as the HLDS 110 (and more particularly the tracking system 116) illustrated in FIG. 1. The HLDS 110 may generate a delivery assignment to make a hybrid last-mile delivery of one or more orders to a pickup location, such as a pickup location 101 illustrated in FIG. 1. For each order associated with the pickup location 101, a customer 162 or other responsible person may be provided with a pickup code. For example, the HLDS 110 may transmit the pickup code to a customer device 160. The pickup code may be encoded as a Quick Response (QR) code, barcode, alphanumeric code, and/or other type of data that identifies the order. At the pickup location 101, the customer 162 may provide the pickup code to an operator of the delivery vehicle 142 (or other personnel). For example, the customer 162 may present the customer device 160, which may execute a mobile application that displays the pickup code. The vehicle delivery device 140 may receive the pickup code. For example, the vehicle delivery device 140 may scan the QR code, barcode, or otherwise receive an input (such as from the operator of the delivery vehicle 142) that includes the pickup code.

In some examples, the delivery vehicle device 140 may access order details associated with the order and provide the order details via a GUI of the delivery vehicle device 140. For example, the delivery vehicle device 140 may decode the QR code, the barcode, or other encoding to access the order details. In some examples, the order details may be encoded in the QR code or the barcode. In other examples, the order details may be stored on the delivery vehicle device 140 in association with an order identifier, which is encoded by the QR code or barcode. The order details may include a location in the delivery vehicle 142 where the order has been loaded so that the operator may find the relevant order.

In some examples, the delivery vehicle device 140 may transmit an indication of receipt of the order code to the HLDS 110. The indication may include pickup information that specifies that the order has been delivered/picked up at the pickup location 101. The pickup information may further include details such as the time of the delivery/pickup, an identification of who picked up the order, any signature confirmation that may have been required, weather conditions at the time of the pickup (which may be automatically obtained by the delivery vehicle device 140 at the time of pickup), pickup queue position, and/or other details of the pickup. Some or all of the pickup information may be used for modeling pickup locations and/or times. For instance, certain customers 162 may be persistently late or on-time, which may be indicated by the time of delivery/pickup, pickup queue position, and pickup time. In another example, weather may impact the time of delivery/pickup (for example, customers and/or delivery vehicles may be late during inclement weather and the length of time it takes to deliver/pickup may be faster or slower depending on the weather).

In some examples, the HLDS 110 may perform exception handling of exceptions from customers 162. Exceptions may include an order cancel, a no-show to a pickup location 101, and/or other exceptions. In some examples, a customer 162 scheduled to meet a delivery vehicle 142 at a pickup location 101 and specified pickup time may cancel an order after the delivery started. In these instances, the HLDS 110 may attempt to find a replacement customer to accept all or part of the customer's canceled order (which may be loaded onto the delivery vehicle 142). For example, the HLDS 110 may provide an incentive to a customer 162 that is to meet the delivery vehicle 142 at the pickup location 101 or other pickup location 101 along a hybrid last-mile delivery route. Likewise, an order for a no-show in which a customer 162 does not appear at the pickup location 101 at the specified pickup time may trigger exception handling in which the HLDS 110 may attempt to secure replacement customers for the order. In some examples, if a replacement customer cannot be secure, the HLDS 110 may charge a cancelation fee to the customer 162, store an indication of such no-show for modeling and customer scoring, and/or take other actions.

In some examples, an exception may be related to a travel route or other condition that prevents meeting at the pickup location 101 at the specified pickup time. For instance, the exception may include a traffic accident, road blockage, or other condition that prevents the meeting. In these examples, an operator of the delivery vehicle 142, one or more customers 162, and/or others may provide the HLDS 110 with such indication. In some examples, the HLDS 110 may identify an alternate pickup location 101 and/or pickup time and broadcast such alternate pickup location 101 and/or pickup time to the delivery vehicle device 140 and/or the customer devices 160. In some examples, the alternate pickup location 101 and/or pickup time may be suggested and broadcast by the delivery vehicle device 140 and/or the customer devices 160 via the HLDS 110.

Figure 15:
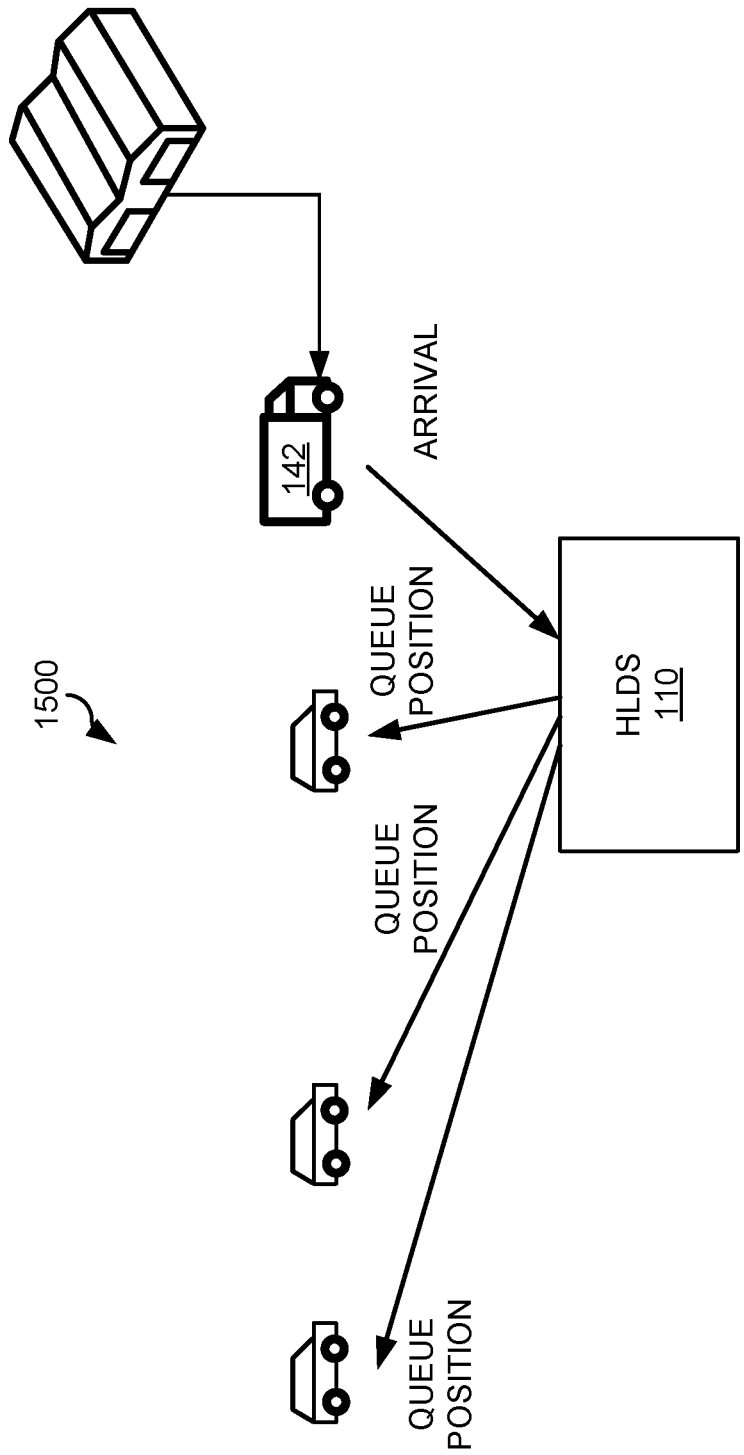
FIG. 15 illustrates a data flow of queuing pickups in a hybrid last-mile delivery of a hybrid last-mile delivery system.

FIG. 15 illustrates a data flow 1500 of queuing pickups in a hybrid last-mile delivery of a hybrid last-mile delivery system, such as the HLDS 110 illustrated in FIG. 1. In some examples, a delivery vehicle 142 may be filled in an order based on pickup locations 101 in a hybrid last-mile delivery route, predicted times of arrival of customers 162, and/or other information. For example, the delivery vehicle 142 may be filled at a distribution center 132 such that the last pickup locations 101 are filled first. In this manner, orders for the first pickup location 101 will be in the back of the delivery vehicle 142. In some examples, for each pickup location 101, orders may be further filled into the delivery vehicle 142 based on a predicted time of arrival of the corresponding customers 162. For example, orders for customers 162 predicted to be late will be loaded into the delivery vehicle 142 before orders for customers predicted to be on-time or early. In this manner, orders for customers 162 predicted to be early will be closer to the back of the delivery vehicle 142.

In some examples, each of the customers 162 may be queued based on their predicted time of arrival. If no predicted time of arrival data is available (such as when there is insufficient data for modeling or the customer 162 is new), the customer 162 may be treated as an on-time customer or other default setting. Customers 162 predicted to be on-time or early may be placed earlier in the pickup queue while customers 162 predicted to be late may be placed later in the pickup queue. Such queue position may be provided to each customer 162 (such as transmitted to respective customer devices 160).

In operation, once a delivery is in progress, the HLDS 110 may periodically receive the current location of each customer 162 and modify the pickup queue based on the current locations of the customers 162. For example, a customer 162 predicted to be early or on-time may be running late or a customer predicted to be late may be early or on-time. Accordingly, the HLDS 110 may revise the pickup queue based on the current location of each customer 162. The HLDS 110 may provide updated queue positions when the pickup queue has changed, periodically at various times (not necessarily when the queue has changed), and/or at other times. Such queue positions may be provided through customer-facing interfaces, such as the GUI 1300.

In some examples, when the delivery vehicle 142 may arrive at a pickup location 101, the delivery vehicle device 140 may transmit an indication of such arrival to the HLDS 110. For example, the pickup location 101 may be geofenced. The delivery vehicle device 140 may periodically determine its current location based on GPS and/or other location information and determine that the current location is within the geofence of the pickup location 101. The delivery vehicle device 140 may then transmit an indication of the arrival of the delivery vehicle 142 at the pickup location 101. Alternatively, the operator of the delivery vehicle 142 may provide an input at the delivery vehicle device 140 to indicate such arrival.

Responsive to the arrival indication of the delivery vehicle 142 at the pickup location 101, the HLDS 110 may provide updates to the customer devices 160 associated with the orders. For example, the HLDS 110 may revise the pickup queue at the time of arrival or indicate to the customers 162 that pickup/delivery at the pickup location is to begin. In some examples, as customers 162 pick up their orders, the next customer 162 in the pickup queue may be provided with an indication to pickup a corresponding order from the delivery vehicle 142. For example, when a prior QR code of a prior customer in the pickup queue has been scanned by the delivery vehicle device 140, this may indicate that the prior customer has picked up the prior order in the pickup queue. The next customer (after the prior customer) in the pickup queue may be notified to proceed to pickup an order. It should be noted that ad hoc pickups may occur at pickup locations 101 instead. For example, instead of queues, customers 162 may simply line up or otherwise pick up their orders from the delivery vehicle 142 without respect to the pickup queues.

Figure 16:
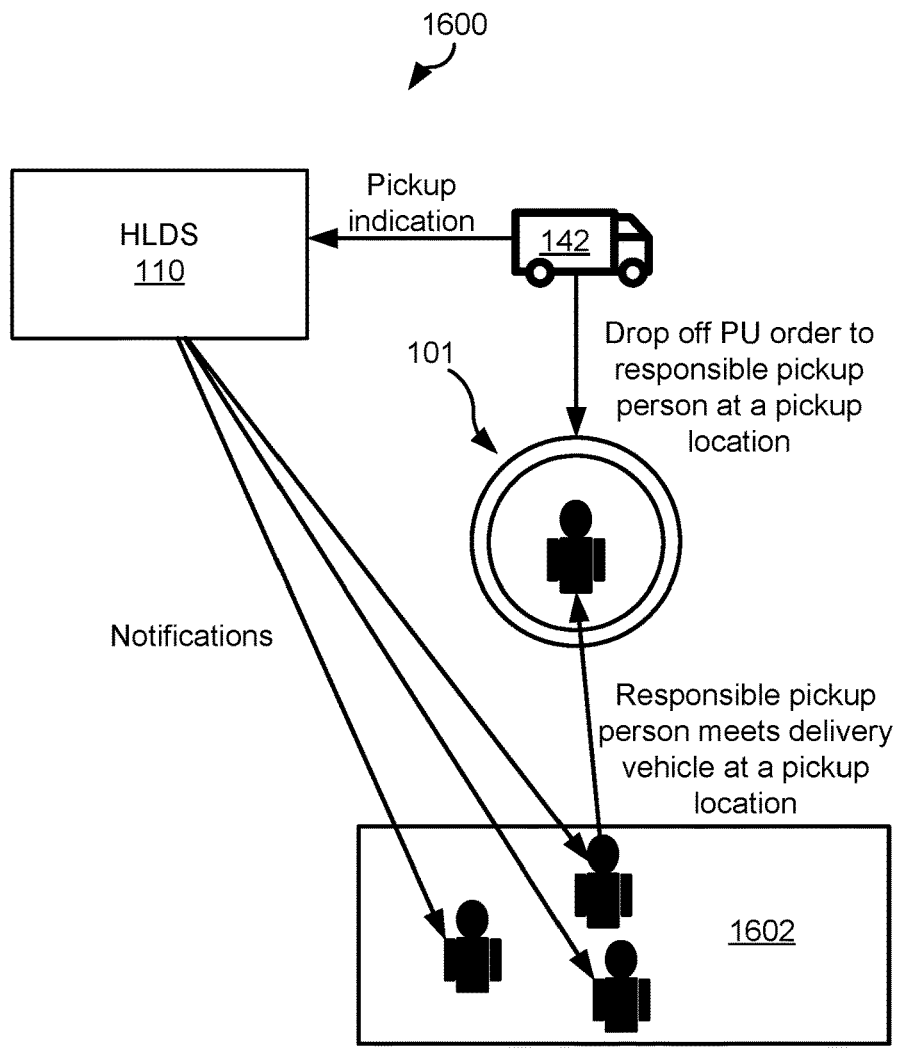
FIG. 16 illustrates a data flow of an example of group pickup ordering in a hybrid last-mile delivery of a hybrid last-mile delivery system.

FIG. 16 illustrates a data flow 1600 of an example of group pickup ordering in a hybrid last-mile delivery of a hybrid last-mile delivery system, such as the HLDS 110 illustrated in FIG. 1. In some examples, a group 1602 of customers 162 ("group customers") may make a group pickup order. Some or all items in a group pickup order may be split amongst the group customers. The group 1602 may specify a responsible pickup person to pickup the group pickup order. That is, the responsible pickup person may meet a delivery vehicle 142 at a pickup location 101 at a pickup time to pick up the group pickup order on behalf of the group 1602. In these examples, the HLDS 110 may store an indication in that the order is a group pickup order, an identification of the group customers, an identification of the responsible pickup person, and/or other information relating to the group 1602. For purposes of modeling (such as tracking and learning from timeliness of customers 162 or other location modeling factors), the responsible pickup person may be used.

Customers may be grouped by the HLDS 110 in various ways. For example, customers 162 may form a group amongst themselves or the HLDS 110 may automatically generate groups based on an indication by a customer 162 that the customer wishes to be placed into group, and/or other ways. In particular, a first customer 162 may indicate that an order is to be a group pickup order. Instead of completing such order (as would be the case for a non-group pickup order), the HLDS 110 may store an indication of the group pickup order, including any items added to the group pickup order by the first customer 162. The first customer 162 may send an invitation to a second customer 162 to join the group. Such invitation may be associated with the group pickup order. For instance, the HLDS 110 may send a link to the group pickup order to the second customer 162 and/or the HLDS 110 may provide the link (or group pickup order identifier) to the first customer 162 for sharing with the second customer 162. The second customer 162 may access the group pickup order and add items to the group pickup order. It should be noted that the second customer 162 may share some or all items of the group pickup order with the first customer 162. Thus, the second customer 162 may not add any new items to the group pickup order at all and instead may simply provide an authorization to be included in the group pickup order. This process may continue until all group customers are included. In some examples, a group order may not be complete until one or more group requirements are met. For example, a bulk item may include five individual items that a first customer 162 may wish to split amongst a group 1602. The first customer may claim two of the five individual items, in which case one or more other group members must claim the remaining three individual items in order to trigger completion of a group order. In another example, a bulk item may include a certain volume or weight in which case group members may claim some or all of the volume of weight in order to trigger completion of a group order.

In some examples, the HLDS 110 may automatically generate a group 1602 (or portions of the group 1602). For example, the HLDS 110 may automatically identify customers 162 that are interested in splitting one or more items, have customer locations or location preferences that are similar or match one another, and/or other matching characteristics. Regardless of how a group 1602 is formed, the delivery vehicle 142 may drop off a group pickup order at a pickup location 101 to the responsible pickup person. The delivery vehicle device 140 may transmit an indication of such pickup to the HLDS 110. For example, the delivery vehicle device 140 may scan a group pickup order code from the customer device 160 of the responsible pickup person.

The HLDS 110 may transmit a notification of the pickup to each of the group customers. Such notification may include a signature verification (if required), a time of the pickup, an identification of the person who picked up the group pickup order, and/or other details of the group pickup order pickup. In some examples, the payment for the group pickup order may be made by one or more of the group customers. For instance, a paying customer may pay for the group pickup order and may be reimbursed later by the other group customers. Such reimbursement may occur outside of the HLDS 110 or the HLDS 110 may process such reimbursement on behalf of the paying customer. In some examples, the payment for the group pickup order may be made by each group customer individually. In any event, the payment may be split amongst the group customers equally, based on items ordered by each group customer, split according to a proportion assigned by the group 1602, and/or other split.

Partner Services

In some examples, the HLDS 110 may provide partner services that assist retail partners 172. For example, the HLDS 110 may interface with inventory management systems or otherwise store inventory of retail partners 172. The HLDS 110 may provide tools for analytics to understand what customers 162 tend or order and any relationship with services that the retail partner 172 provides. In this manner, the HLDS 110 may provide smart inventory services to help the retail partner 172 understand which items should be ordered, what incentives to provide to customers, and/or other analytics.

Figure 17:
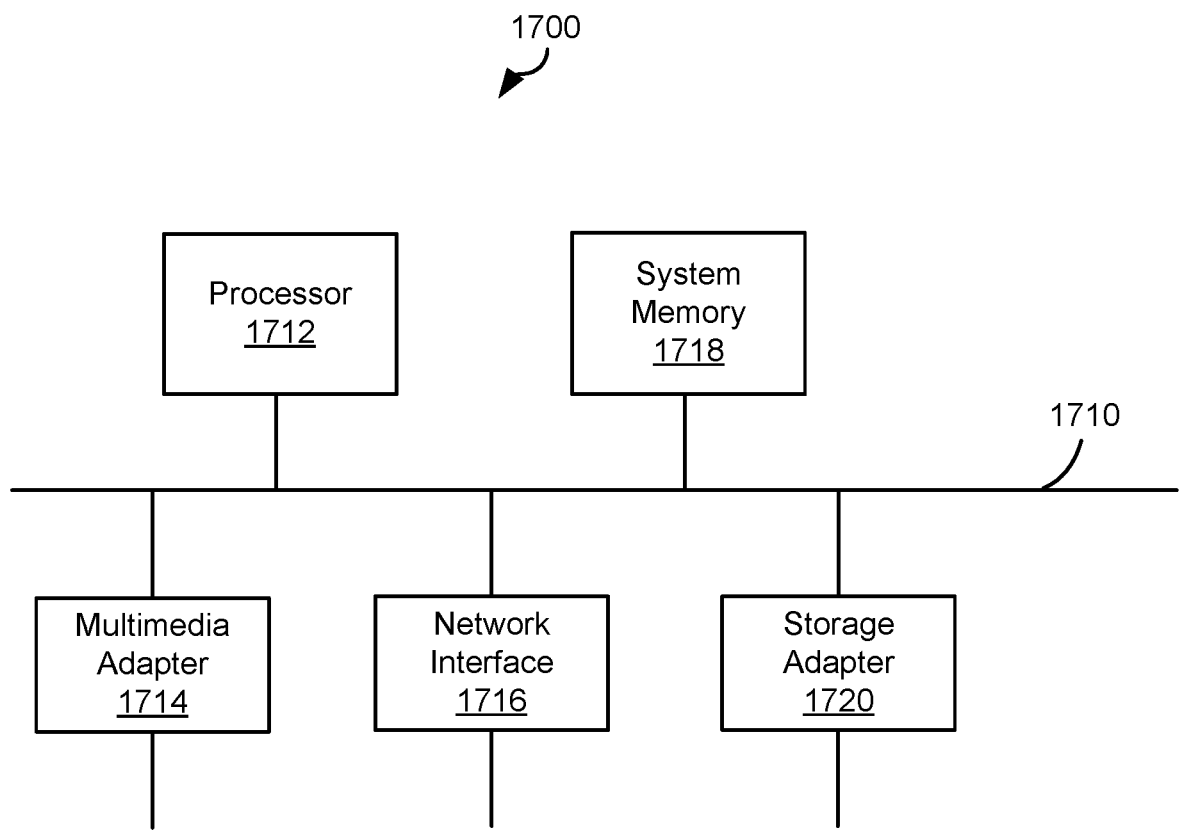
FIG. 17 illustrates an example of a computer system that may be implemented by devices illustrated in FIG. 1.

FIG. 17 illustrates an example of a computer system 1700 that may be implemented by devices (such as the HLDS 110, distribution center device 130, delivery vehicle device 140, customer device 160, retail partner device 170, and/or other components) illustrated in FIG. 1. The computer system 1700 may be part of or include the system environment 100 to perform the functions and features described herein. For example, various ones of the devices of system environment 100 may be implemented based on some or all of the computer system 1700.

The computer system 1700 may include, among other things, an interconnect 1710, a processor 1712, a multimedia adapter 1714, a network interface 1716, a system memory 1718, and a storage adapter 1720.

The interconnect 1710 may interconnect various subsystems, elements, and/or components of the computer system 1700. As shown, the interconnect 1710 may be an abstraction that may represent any one or more separate physical buses, point-to-point connections, or both, connected by appropriate bridges, adapters, or controllers. In some examples, the interconnect 1710 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1384 bus, or "firewire," or other similar interconnection element.

In some examples, the interconnect 1710 may allow data communication between the processor 1712 and system memory 1718, which may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 1712 may control operations of the computer system 1700. In some examples, the processor 1712 may do so by executing instructions such as software or firmware stored in system memory 1718 or other data via the storage adapter 1720. In some examples, the processor 1712 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 1714 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 1716 may provide the computer system 1700 with an ability to communicate with a variety of remove devices over a network such as the communication network 107 illustrated in FIG. 1. The network interface 1716 may include, for example, an Ethernet adapter, a Fibre Channel adapter, and/or other wired- or wireless-enabled adapter. The network interface 1716 may provide a direct or indirect connection from one network element to another, and facilitate communication and between various network elements. The storage adapter 1720 may connect to a standard computer readable medium for storage and/or retrieval of information, such as a fixed disk drive (internal or external).

The various databases (such as databases 121-129) described herein may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The various components illustrated in the Figures may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

It should be understood that the various methods (such as methods 600-1000) may include additional operations and that some of the operations described therein may be removed and/or modified without departing from the scopes of the methods. The descriptions of the methods are made with reference to the features depicted in other Figures for purposes of illustration.

Some or all of the operations set forth in the methods (such as methods 600-1000) may be included as utilities, programs, or subprograms, in any desired computer accessible medium. In addition, the methods may be embodied by computer programs, which may exist in a variety of forms. For example, some operations of the methods may exist as machine-readable instructions, including source code, object code, executable code or other formats. Any of the above may be embodied on a non-transitory computer readable storage medium. Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

In the description, numerous specific details have been described in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the description of the present disclosure. Also, for simplicity and illustrative purposes, the present disclosure is described by referring mainly to examples. As used herein, the terms "a" and "an" are intended to denote at least one of a particular element, the term "includes" means includes but not limited to, the term "including" means including but not limited to, and the term "based on" means based at least in part on.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A system of filling a delivery vehicle for hybrid last-mile delivery, comprising:
a processor programmed to:
access training data comprising data from prior filled delivery vehicles and a plurality of features associated with the prior filled delivery vehicles;
train a machine-learning (ML) model to learn relationships between the plurality of features and labeled data indicating whether a prior fill level of the prior filled delivery vehicles from the training data was an appropriate fill level, the labeled data including at least one of an amount of time for delivery at a pickup location and feedback from at least one prior customer indicating a level of satisfaction of the pickup location;
generate a fill-model using the ML model, the fill-model outputting at least one of a first probability that a fill level of the delivery vehicle is a suitable fill level and a second probability that the fill level of the delivery vehicle is not a suitable fill level;
access an order queue comprising one or more pickup orders to be picked up by respective customers at a pickup location;
identify, based on the fill-model, a plurality of items, ordered by the respective customers and associated with the one or more pickup orders, that satisfy a fill criterion comprising a minimum fill level of the delivery vehicle to service the pickup location, the minimum fill level defining a minimum amount of a capacity of the delivery vehicle to be filled to ensure that the capacity of the delivery vehicle is filled with items at least to the minimum amount;
wherein to identify the plurality of items based on the fill-model, the processor is programmed to:
provide, as input to the ML model, data relating to the plurality of items, the data relating to the plurality of items having respective values of the plurality of features; and
determine, based on an output of the ML model, that the plurality of items satisfies the fill criterion;
responsive to identification of the plurality of items that satisfy the fill criterion, trigger the plurality of items to be loaded onto the delivery vehicle at a distribution center to initiate delivery of the plurality of items;
transmit, to a delivery vehicle device, the one or more pickup orders corresponding to the plurality of items and a specified time at which to be at the pickup location to meet the respective customers; and
transmit, to each customer associated with the plurality of pickup orders, a notification to meet the delivery vehicle to pick up the plurality of items at the pickup location and the specified time at which to meet the delivery vehicle for pickup.

2. The system of claim 1, wherein the fill-model comprises a rules-based model, and wherein to apply the fill-model, the processor is programmed to:
access one or more fill rules that specify the fill criterion, the fill criterion specifying a minimum number of items, a minimum value of items, a minimum volume of items to consider the delivery vehicle to be filled;
determine whether the plurality of items satisfy the one or more fill rules.

3. The system of claim 2, wherein the processor is programmed to:
iterate through the one or more orders to identify different sets of items to be evaluated against the one or more fill rules.

4. The system of claim 1, wherein the ML model is trained to identify items that will likely fit within the delivery vehicle based on prior deliveries.

5. The system of claim 1, wherein the ML model is trained to identify items that will likely be picked up without cancelations by the respective customers, as determined from prior deliveries from the training data, based on a probability of cancelation, and wherein to determine that the plurality of items satisfies the fill criterion, the processor is further programmed to: identify the plurality of items based on respective probabilities of cancelation.

6. The system of claim 1, wherein the processor is further programmed to:
prior to the identification the plurality of items that satisfies the fill criterion, determine that a previously evaluated plurality of items, from among the plurality of items, did not satisfy the fill criterion;
identify one or more items that, when added to the previously evaluated plurality of items, will satisfy the fill criterion;
identify one or more customers that may be interested in the identified one or more items; and
transmit, to the identified one or more customers, a recommendation to add the identified one or more items.

7. The system of claim 1, wherein the plurality of items includes retail items to be delivered to a retail partner at a retail address, and wherein the processor is further programmed to:
set a delivery route for the delivery vehicle, the delivery route including the pickup location and the retail address.

8. The system of claim 1, wherein the processor is further programmed to:
determine that the delivery vehicle is over-capacity;
identify one or more items that would address the over-capacity; and
transmit an incentive to a customer associated with the one or more items to accept an alternate pickup location or alternative pickup time.

9. The system of claim 1, wherein the processor is further programmed to:
determine an arrival order in which customers are predicted to arrive at the pickup location to meet the delivery vehicle; and determine a loading order in which a plurality of pickup orders of the customers is to be loaded into the delivery vehicle based on the determined arrival order.

10. The system of claim 1, wherein the processor is further programmed to:
   determine, for each customer, a probability that the customer will pick up a respective pickup order at the pickup location; and
   determine a loading order in which a plurality of pickup orders of the customers is to be loaded into the delivery vehicle based on the determined probability determined for each customer.

11. The system of claim 1, wherein the delivery vehicle is to deliver to the pickup location with a first plurality of pickup orders and a second location with a second plurality of pickup orders, and wherein the processor is further programmed to:
   determine a first loading order of the first plurality of pickup orders in a first section of the delivery vehicle; and
   determine a second loading order of the second plurality of pickup orders in a second section of the delivery vehicle.

12. A method of filling a delivery vehicle for hybrid last-mile delivery, comprising:
   accessing training data comprising data from prior filled delivery vehicles and a plurality of features associated with the prior filled delivery vehicles;
   training a machine-learning (ML) model to learn relationships between the plurality of features and labeled data indicating whether or not a prior fill level of the prior filled delivery vehicles from the training data was an appropriate fill level, the labeled data including at least one of an amount of time for delivery at a pickup location and feedback from at least one prior customer indicating a level of satisfaction of the pickup location;
   generating a fill-model using on the ML model, the fill-model outputting at least one of a first probability that a fill level of the delivery vehicle is a suitable fill level and a second probability that the fill level of the delivery vehicle is not a suitable fill level;
   accessing, by a processor, an order queue comprising one or more pickup orders to be picked up by respective customers at a pickup location;
   identifying, by the processor, based on the fill-model, a plurality of items, ordered by the respective customers and associated with the one or more pickup orders, that satisfy a fill criterion comprising a minimum fill level of the delivery vehicle to service the pickup location, the minimum fill level defining a minimum amount of a capacity of the delivery vehicle to be filled to ensure that the capacity of the delivery vehicle is filled with items at least to the minimum amount,
      wherein identifying the plurality of items based on the fill-model comprises:
         providing, as input to the ML model, data relating to the plurality of items, the data relating to the plurality of items having respective values of the plurality of features; and
         determining, based on an output of the ML model, that the plurality of items satisfies the fill criterion;
      wherein the plurality of items includes retail items to be delivered to a retail partner at a retail address;
   responsive to identification of the plurality of items that satisfy the fill criterion, triggering, by the processor, the plurality of items to be loaded onto the delivery vehicle at a distribution center to initiate delivery of the plurality of items;
   transmitting, by the processor, to a delivery vehicle device, the one or more pickup orders corresponding to the plurality of items and a specified time at which to be at the pickup location to meet the respective customers;
   transmitting, by the processor, to each customer associated with the plurality of pickup orders, a notification to meet the delivery vehicle to pick up the plurality of items at the pickup location and the specified time at which to meet the delivery vehicle for pickup; and
   setting, by the processor, a delivery route for the delivery vehicle, the delivery route including the pickup location and the retail address.

13. The method of claim 12, wherein the fill-model comprises a rules-based model, and wherein applying the fill-model comprises:
   accessing one or more fill rules that specify the fill criterion, the fill criterion specifying a minimum number of items, a minimum value of items, a minimum volume of items to consider the delivery vehicle to be filled; and
   determining whether the plurality of items satisfy the one or more fill rules.

14. The method of claim 13, further comprising:
   iterating through the one or more orders to identify different sets of items to be evaluated against the one or more fill rules.

15. The method of claim 12, wherein the ML model is trained to identify items that will likely fit within the delivery vehicle based on prior deliveries from the training data, based on a probability of cancelation, and wherein identifying the plurality of items that satisfies the fill criterion comprises identifying the plurality of items based on respective probabilities of cancelation.

16. The method of claim 12, wherein the ML model is trained to identify items that will likely be picked up without cancelations based on prior deliveries.

17. A non-transitory computer readable medium storing instructions that, when executed by a processor, causes the processor to:
   access training data comprising data from prior filled delivery vehicles and a plurality of features associated with the prior filled delivery vehicles;
   train a machine-learning (ML) model to learn relationships between the plurality of features and labeled data indicating whether or not a prior fill level of the prior filled delivery vehicles from the training data was an appropriate fill level, the labeled data including at least one of an amount of time for delivery at a pickup location and feedback from at least one prior customer indicating a level of satisfaction of the pickup location,
   access an order queue comprising one or more pickup orders to be picked up by respective customers at a pickup location;
   generate a fill-model using on the ML model, the fill-model outputting at least one of a first probability that a fill level of the delivery vehicle is a suitable fill level and a second probability that the fill level of the delivery vehicle is not a suitable fill level;
   identify, based on the fill-model, a plurality of items, ordered by the respective customers and associated with the one or more pickup orders, that satisfy a fill criterion comprising a minimum fill level of a delivery vehicle to service the pickup location, the minimum fill level defining a minimum amount of a capacity of the delivery vehicle to be filled to ensure that the capacity of the delivery vehicle is filled with items at least to the minimum amount, wherein to identify the plurality of items based on the fill-model, the instructions, when executed by the processor, further cause the processor to:
- provide, as input to the ML model, data relating to the plurality of items, the data relating to the plurality of items having respective values of the plurality of features; and
- determine, based on an output of the ML model, that the plurality of items satisfies the fill criterion;

responsive to identification of the plurality of items that satisfy the fill criterion, trigger the plurality of items to be loaded onto the delivery vehicle at a distribution center to initiate delivery of the plurality of items;

transmit, to a delivery vehicle device, the one or more pickup orders corresponding to the plurality of items and a specified time at which to be at the pickup location to meet the respective customers; and transmit, to each customer associated with the plurality of pickup orders, a notification to meet the delivery vehicle to pick up the plurality of items at the pickup location and the specified time at which to meet the delivery vehicle for pickup.

18. The system of claim 1, wherein the processor is further programmed to:
- after the identification of the plurality of items that satisfy the fill criterion, receive an indication that an item in the plurality of items has been canceled from a pickup order;
- identify one or more customers that may be interested in the canceled item or a replacement item instead of the canceled item that will fulfill the fill criterion; and
- transmit, to the identified one or more customers, a recommendation to add the canceled item or the replacement item.

* * * * *